| (12) | United States Patent | (10) Patent No.: US 12,467,660 B2 |
|---|---|---|
| | Park et al. | (45) Date of Patent: Nov. 11, 2025 |

(54) GAS FURNACE AND AIR CONDITIONER HAVING THE SAME

(71) Applicant: LG ELECTRONICS INC., Seoul (KR)

(72) Inventors: Janghee Park, Seoul (KR); Yongki Jeong, Seoul (KR); Jinwoo Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 476 days.

(21) Appl. No.: 17/978,567

(22) Filed: Nov. 1, 2022

(65) Prior Publication Data

US 2023/0147831 A1   May 11, 2023

(30) Foreign Application Priority Data

Nov. 5, 2021   (KR) .................. 10-2021-0151811

(51) Int. Cl.
*F24H 3/08* (2022.01)
*F23N 1/00* (2006.01)
*F24H 15/305* (2022.01)

(52) U.S. Cl.
CPC ............. *F24H 3/087* (2013.01); *F23N 1/005* (2013.01); *F24H 15/305* (2022.01); *F23N 2237/02* (2020.01); *F24H 2210/00* (2013.01)

(58) Field of Classification Search
CPC ... F24H 3/08; F24H 3/087; F24H 3/06; F24H 9/2085; F24H 9/0068; F24H 9/0063; F24D 19/1084; F23N 2237/02; F23D 14/04; F23D 14/08
See application file for complete search history.

(56) References Cited

U.S. PATENT DOCUMENTS

| 5,186,620 A | 2/1993 | Hollingshead |
| 6,860,734 B2 | 3/2005 | Zia et al. |
| 2016/0169558 A1* | 6/2016 | Toda ................. F24H 3/065 126/116 A |

FOREIGN PATENT DOCUMENTS

WO   WO 2005/095870   10/2005

* cited by examiner

*Primary Examiner* — Ko-Wei Lin
(74) *Attorney, Agent, or Firm* — KED & ASSOCIATES

(57) ABSTRACT

Disclosed are a gas furnace and an air conditioner having the same. The gas furnace includes: a burner for burning fuel; a manifold providing the fuel to an entry of the burner; a heat exchanger spaced apart from an exit of the burner and providing a passage for combustion gas generated by the burner; an inducer for causing a fluid to flow through the burner and the heat exchanger; a blower for causing a flow of air passing around the heat exchanger; and an air shutter positioned between the manifold and the entry of the burner. The air shutter includes: a housing having an inner space that communicates with the manifold and the entry of the burner; and a primary hole formed to penetrate the housing and able to be opened and closed.

17 Claims, 15 Drawing Sheets

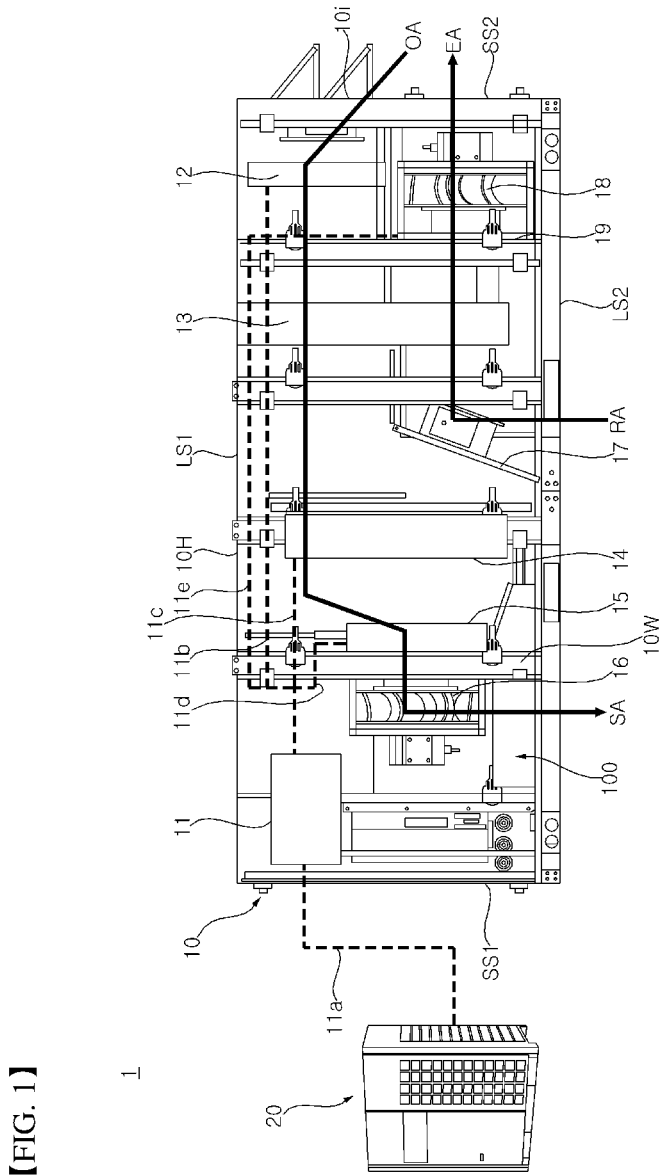
[FIG. 1]

[FIG. 2]
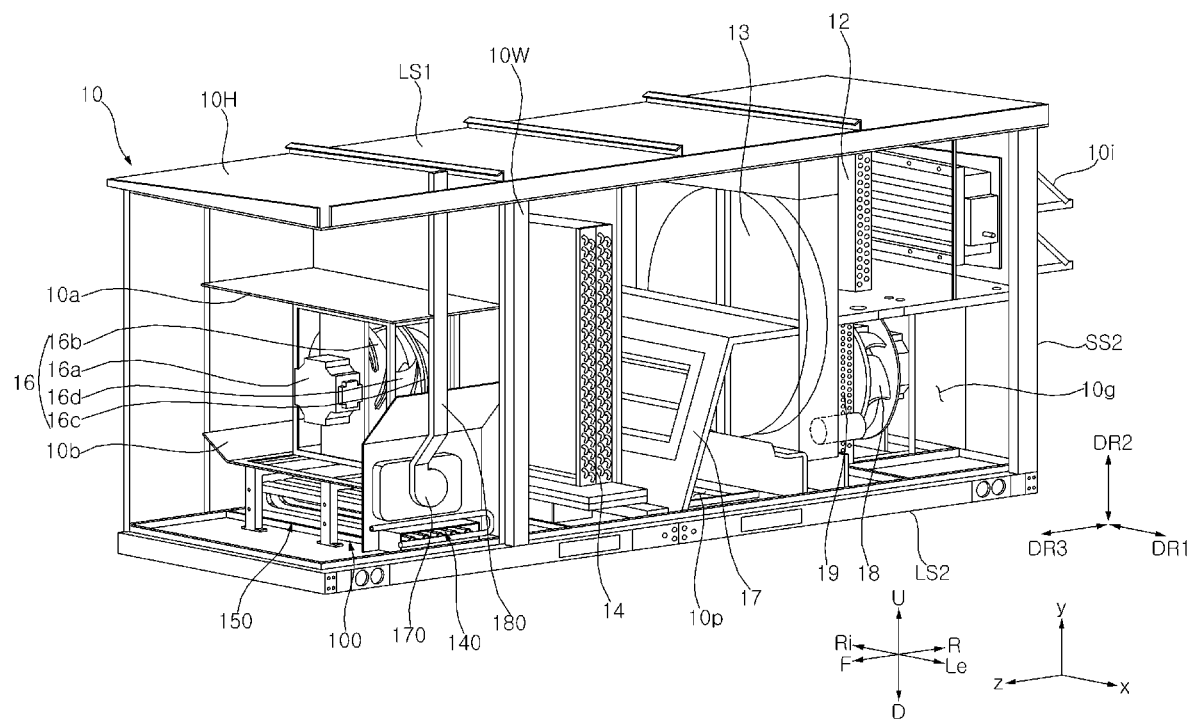

[FIG. 3]
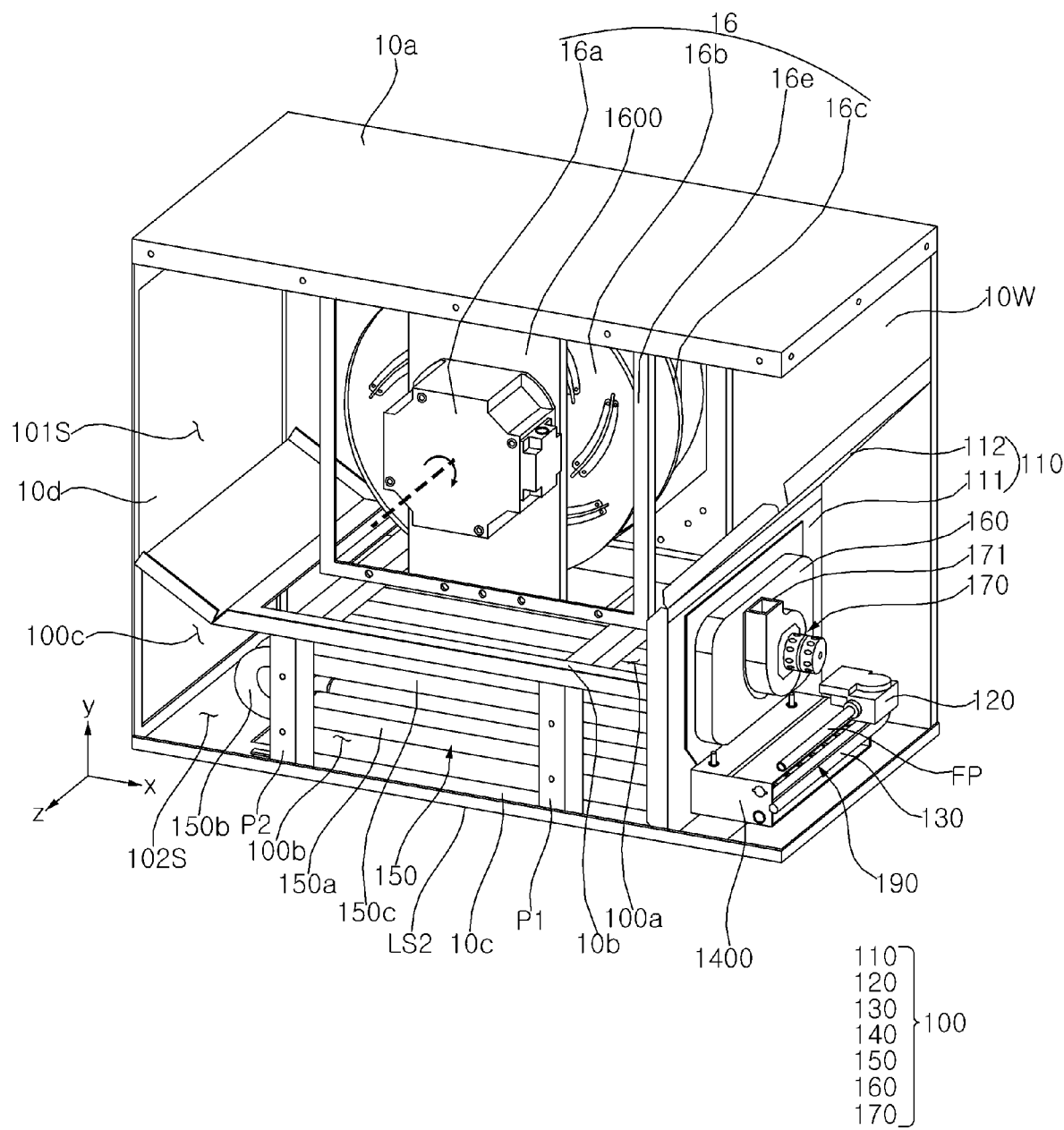

[FIG. 4]
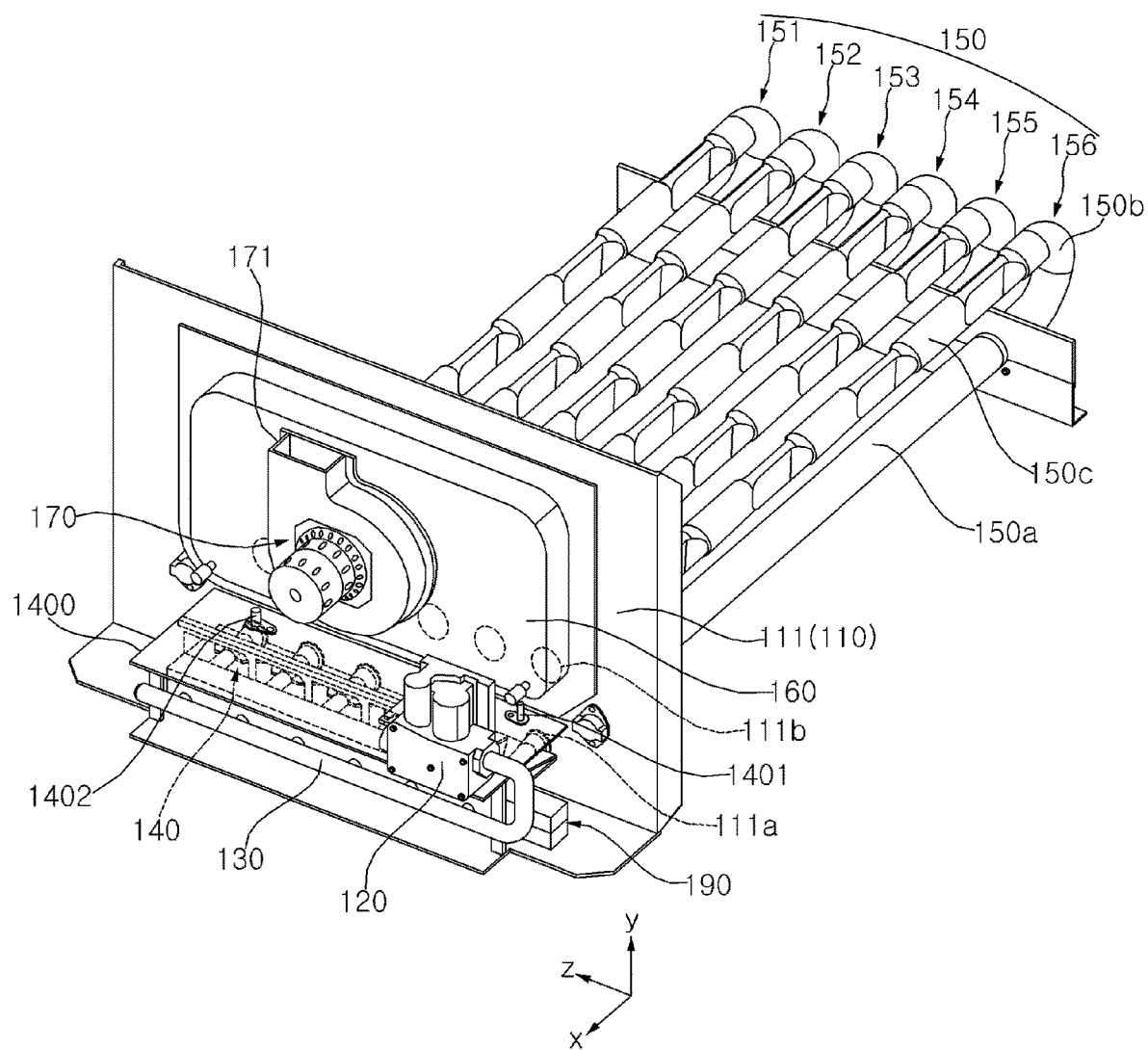

[FIG. 5]
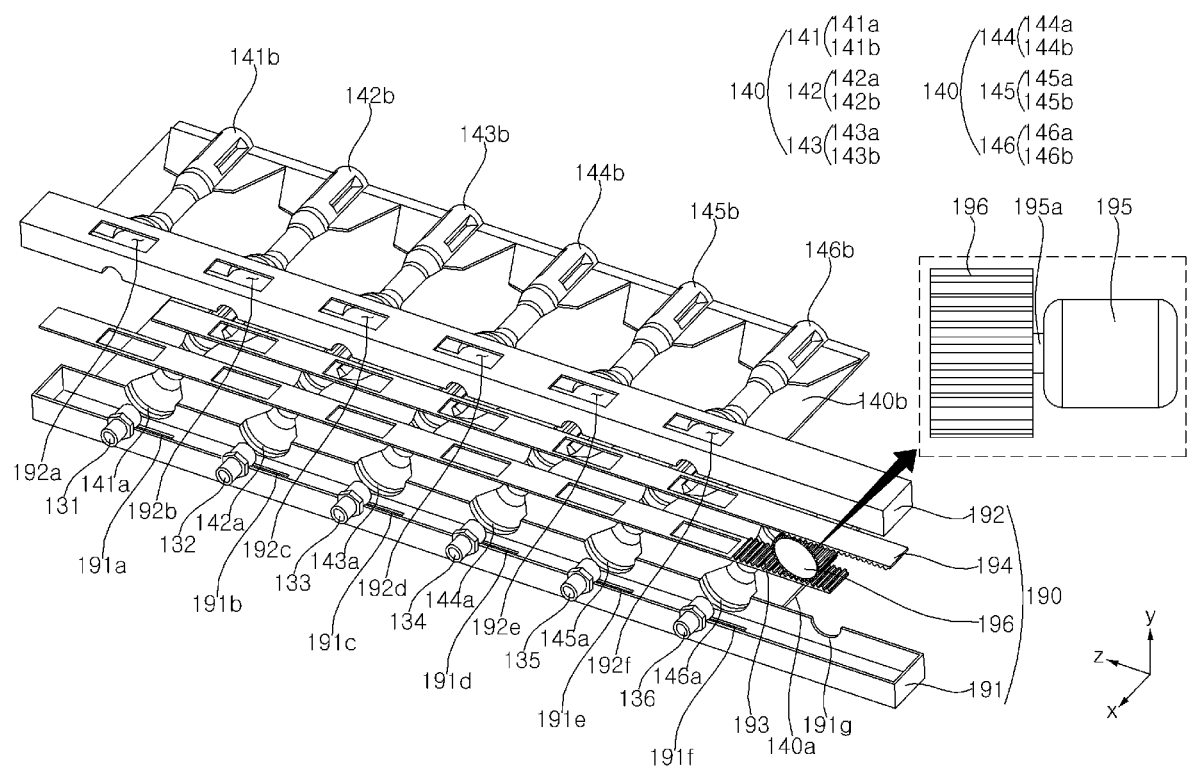

[FIG. 6]
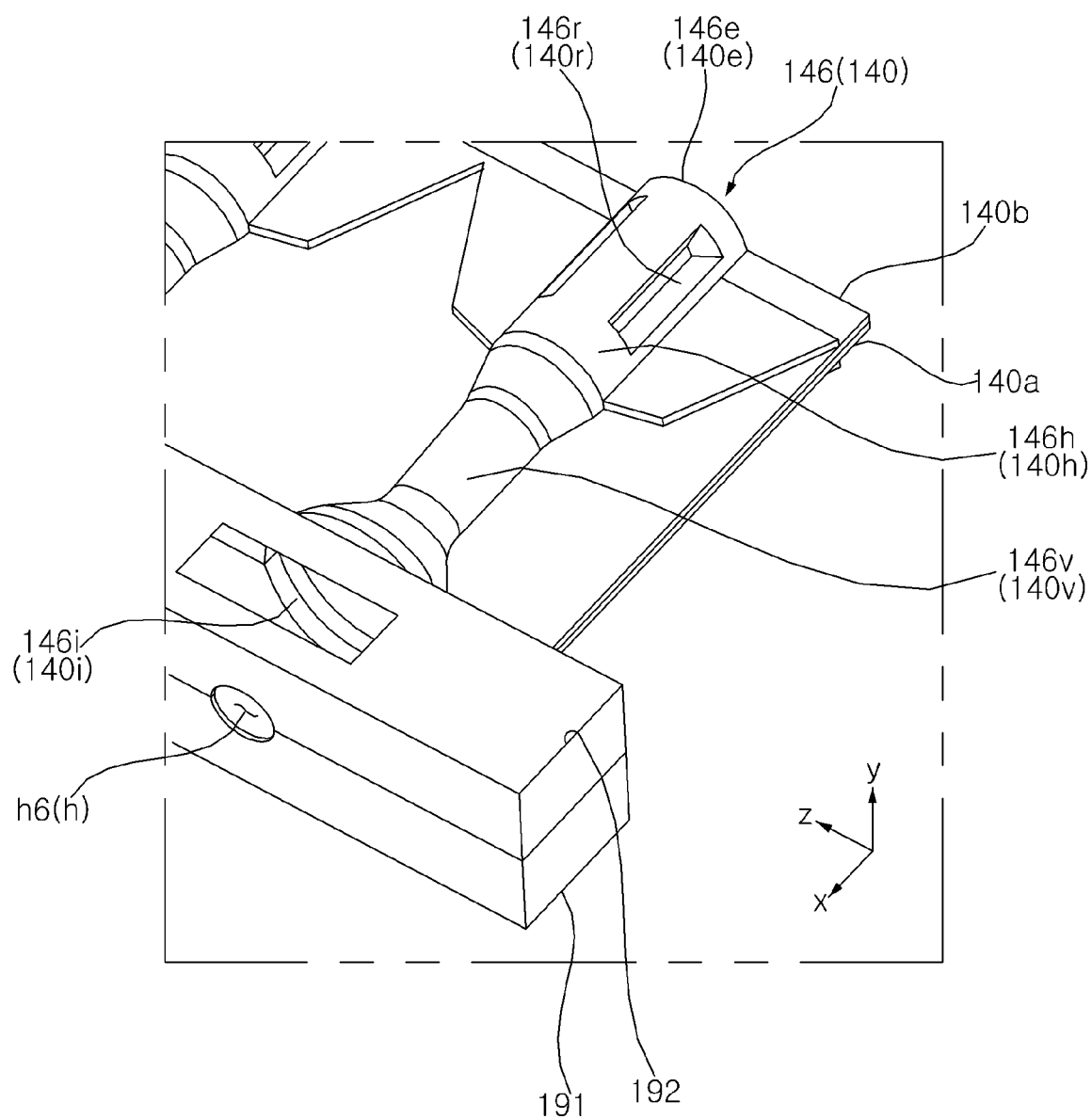

[FIG. 7]
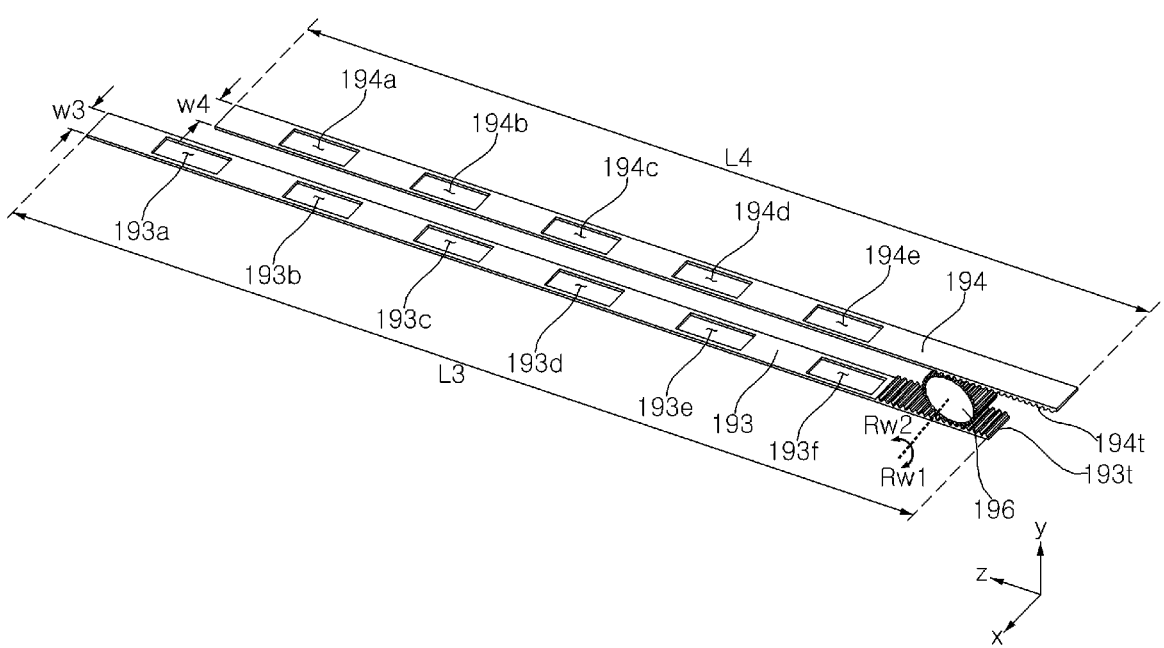

[FIG. 8]
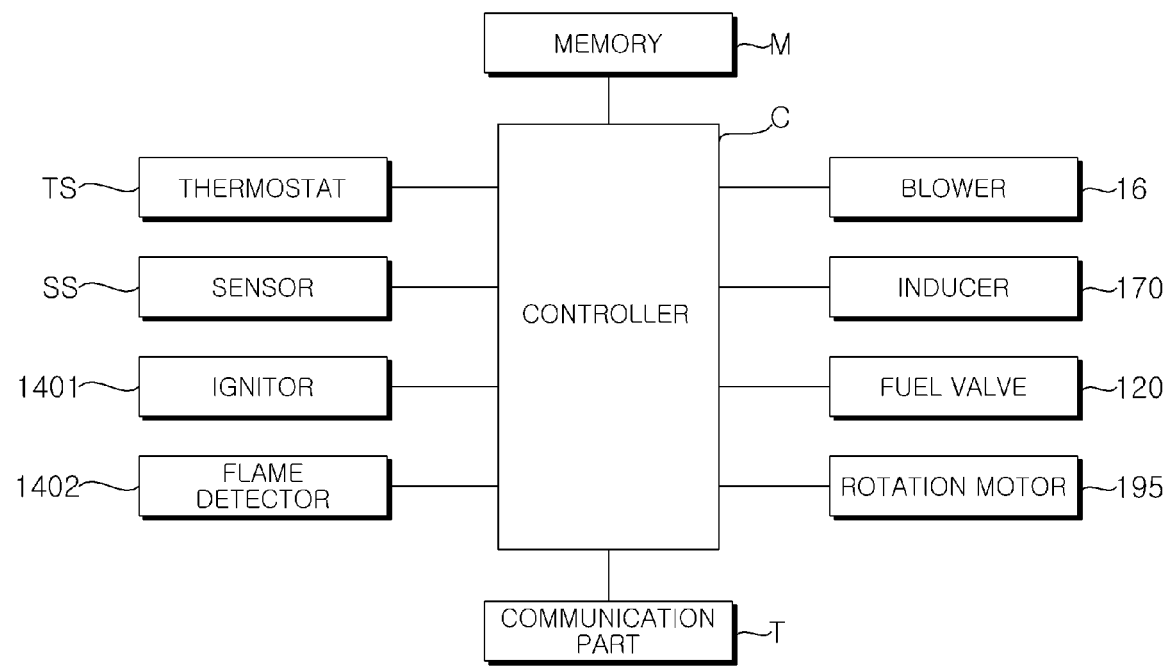

[FIG. 9]
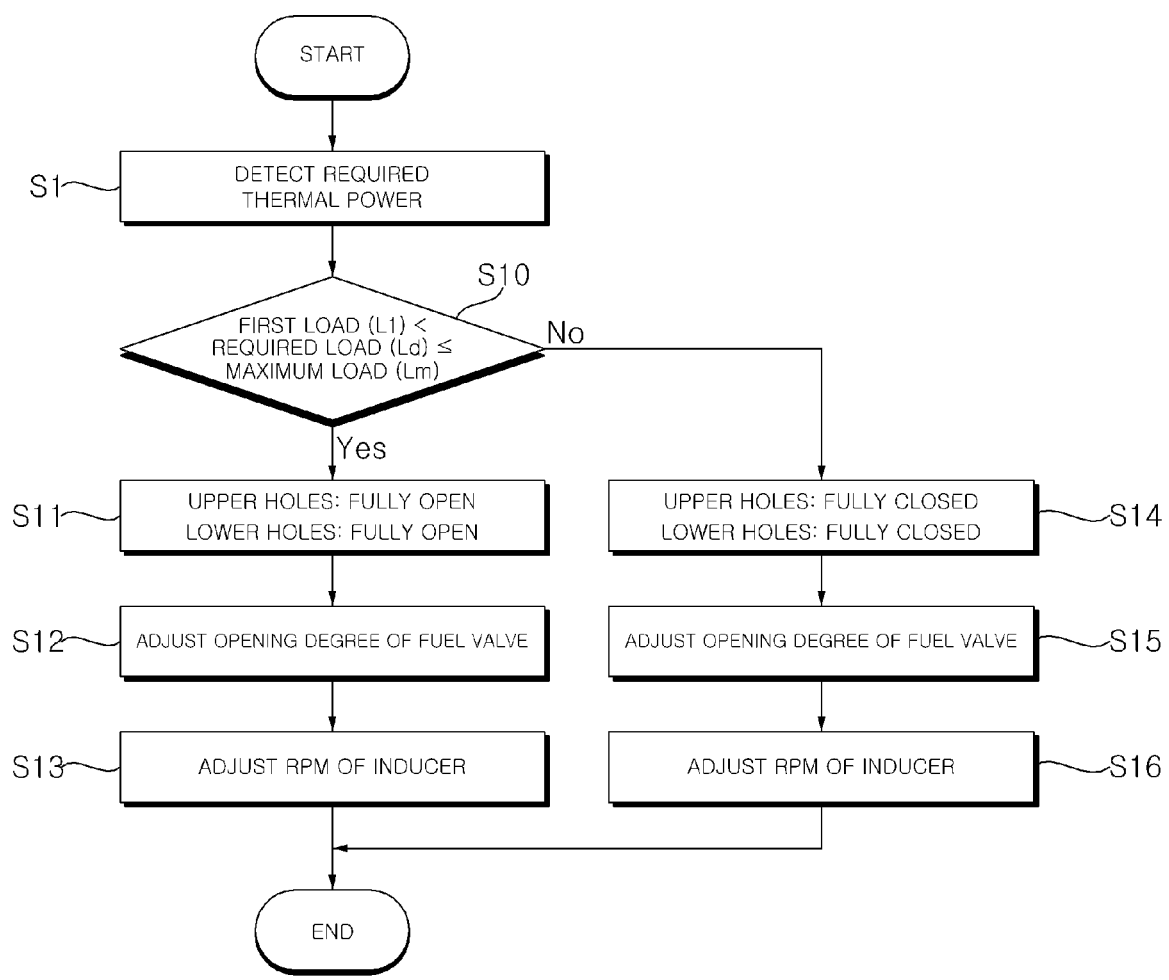

[FIG. 10]
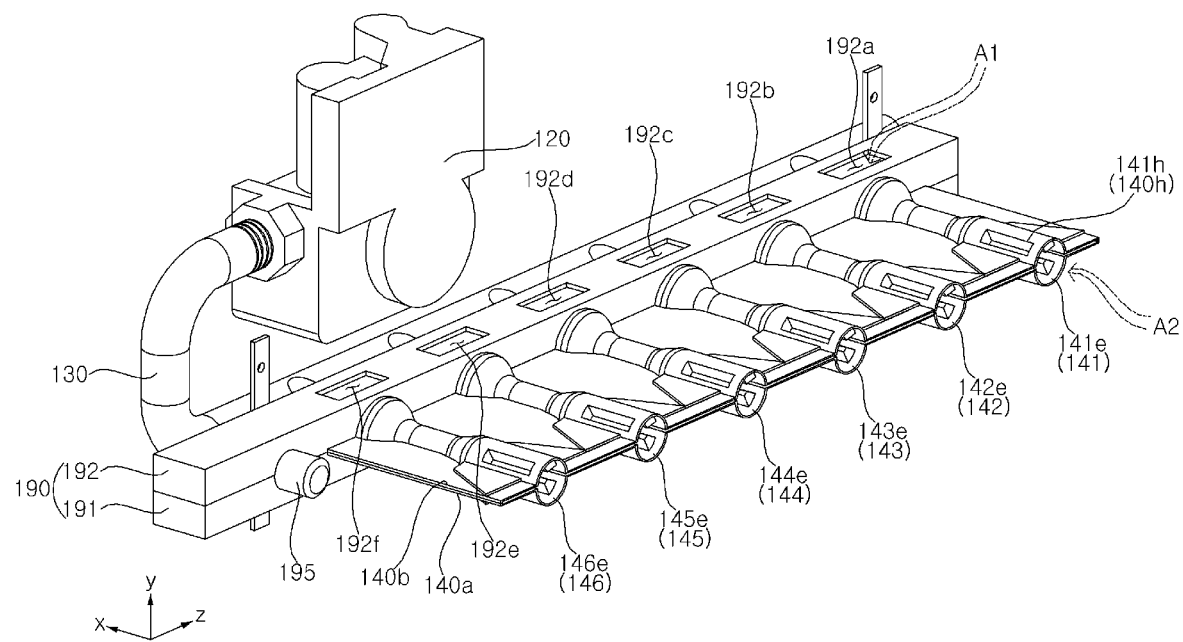

[FIG. 11]
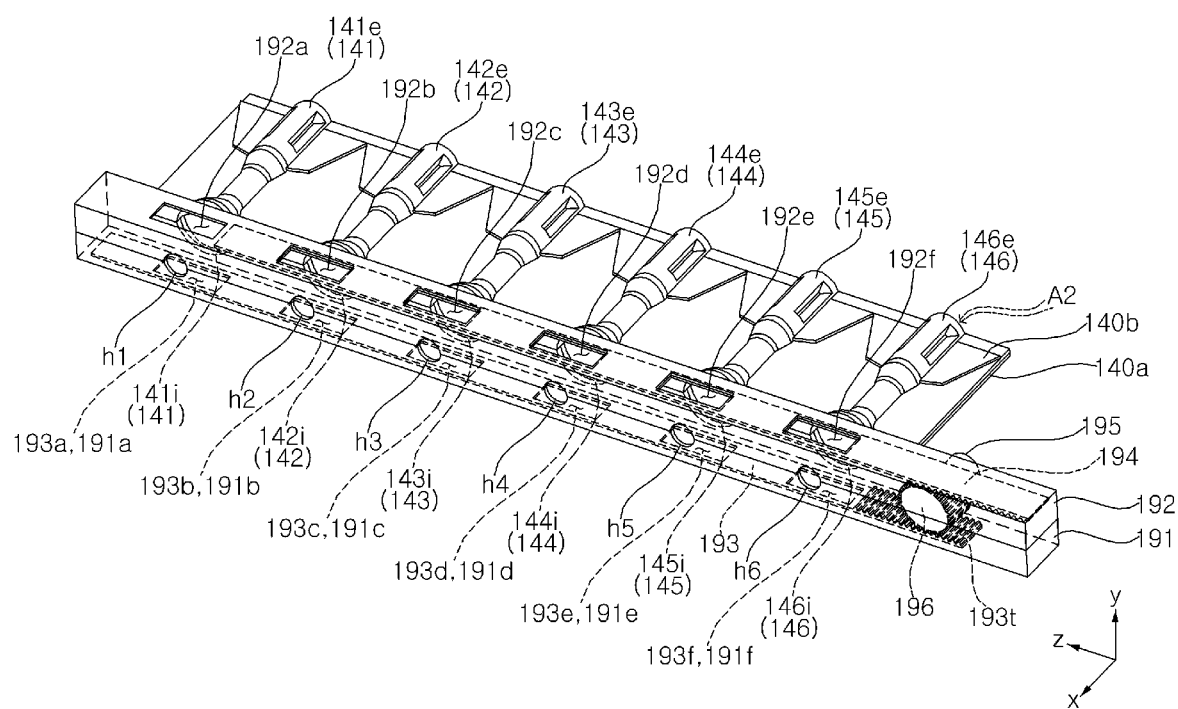

[FIG. 12]
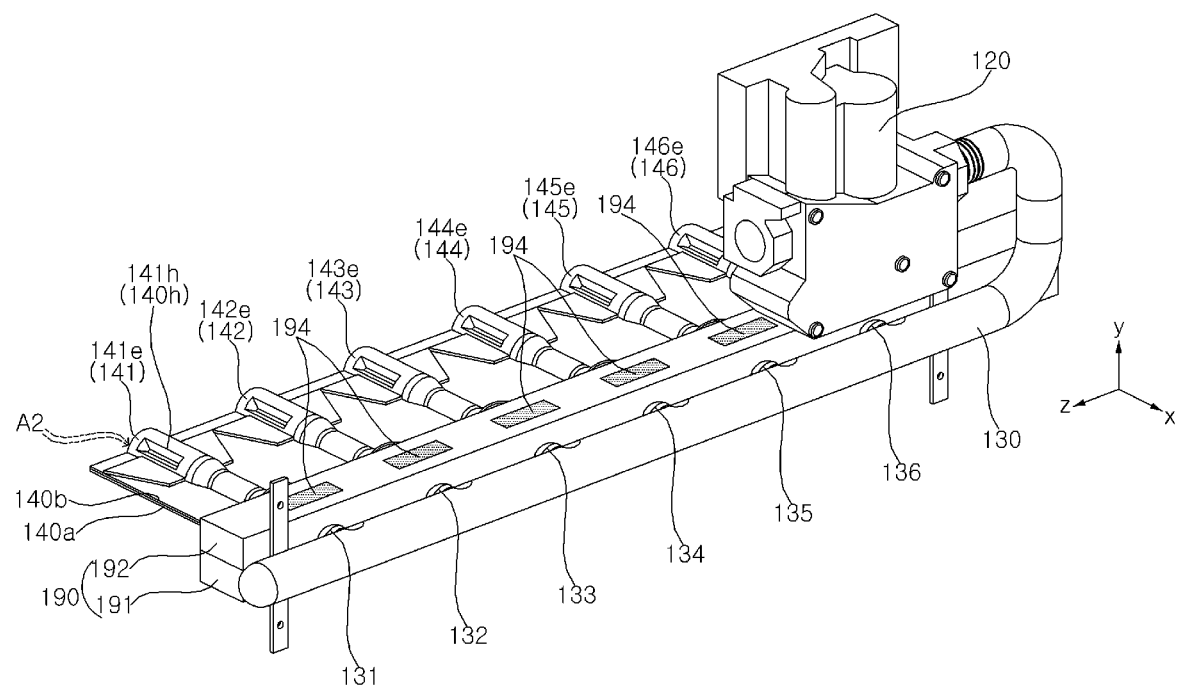

[FIG. 13]
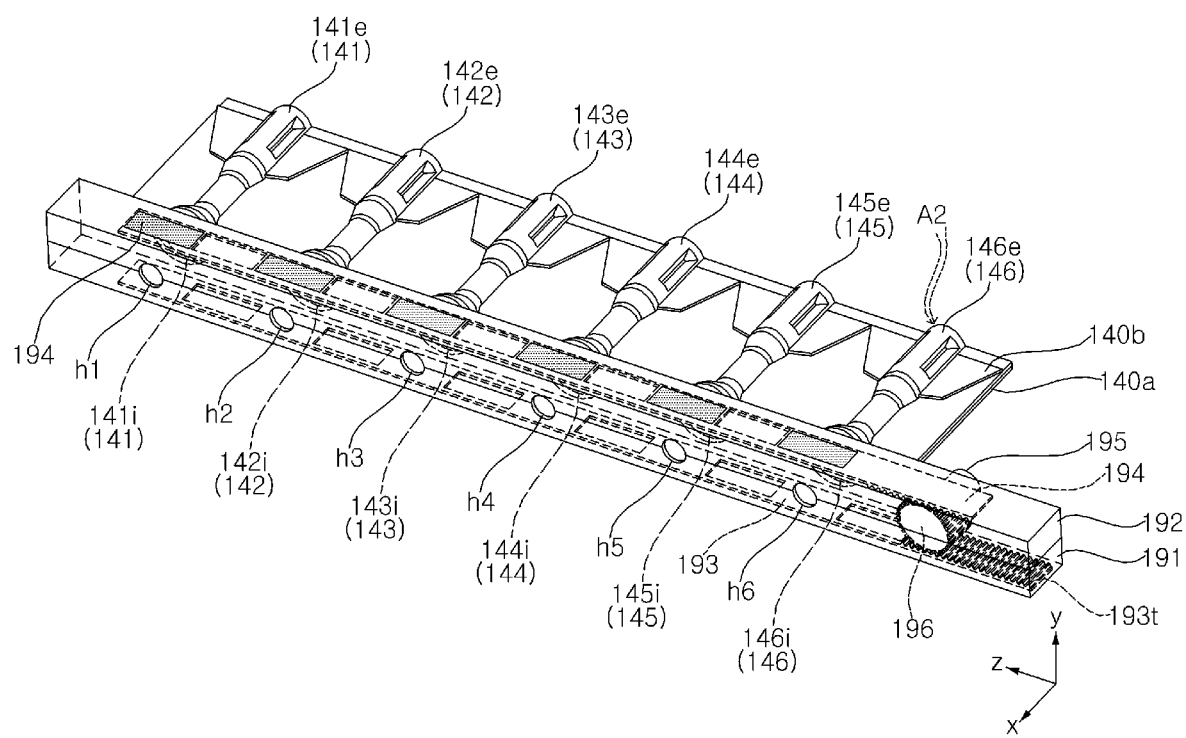

[FIG. 14]
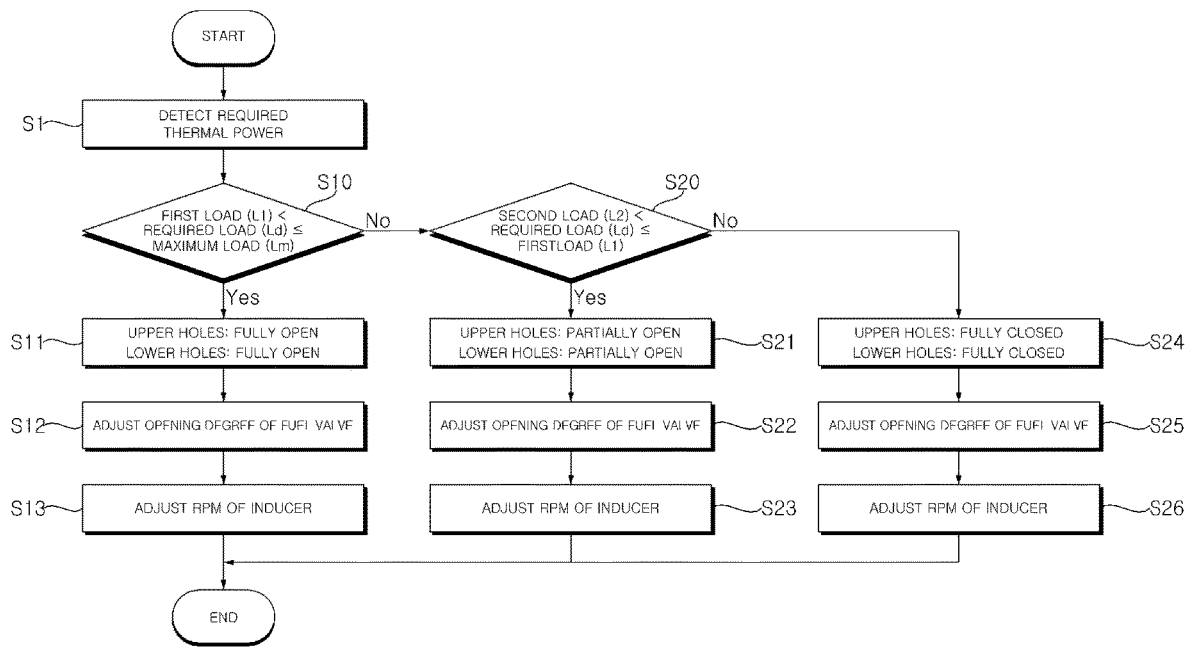

[FIG. 15]
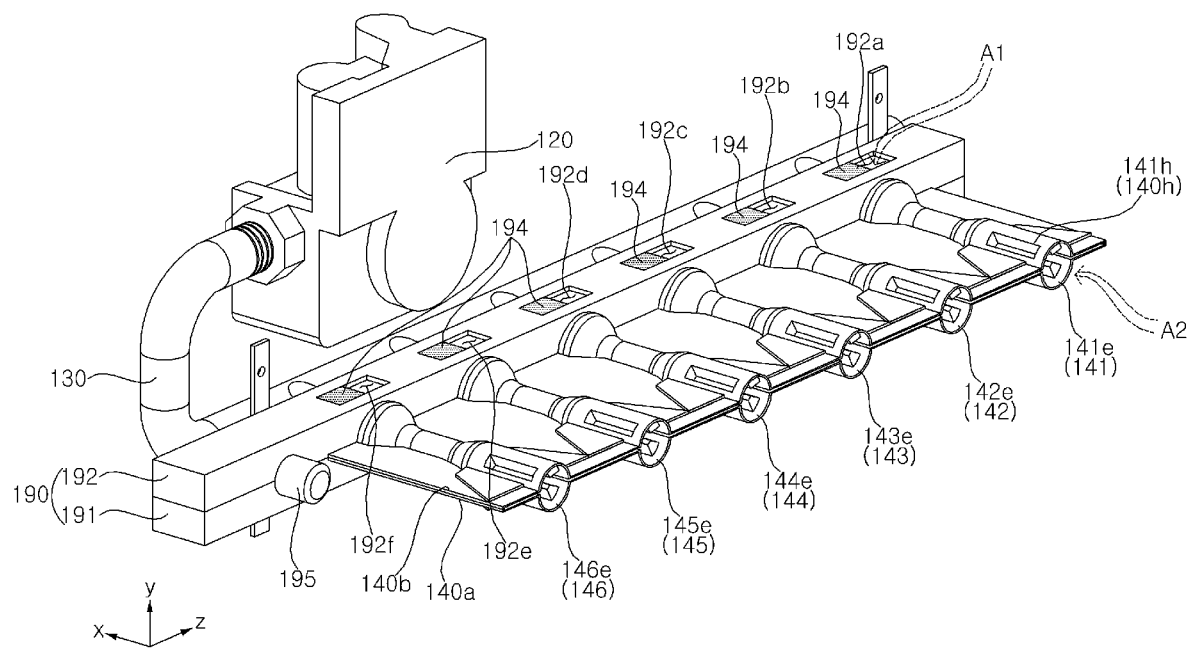

GAS FURNACE AND AIR CONDITIONER HAVING THE SAME

CROSS-REFERENCE TO RELATED PATENT APPLICATIONS

This application claims priority to Korean Patent Application No. 10-2021-0151811, filed Nov. 5, 2021, whose entire disclosures are hereby incorporated by reference.

BACKGROUND OF THE DISCLOSURE

Field of the Disclosure

The present disclosure relates to a gas furnace and an air conditioner having the same.

Related Art

In general, an air conditioner refers to an apparatus for cools and heating an indoor space through compression, condensation, expansion, and evaporation of refrigerant. The air conditioner can improve indoor air quality by exchanging indoor air unit with outdoor air through a ventilator. In addition, the ventilator may increase the temperature of air supplied to the indoor space by using high-temperature combustion gas of a gas furnace.

U.S. Pat. No. 5,186,620 (registered on Feb. 16, 1993) and U.S. Pat. No. 6,860,734 B2 (registered on Mar. 1, 2005) disclose an in shot burner having a venturi tube and a retainer. In this case, primary air is introduced into a burner by fuel, which is injected from a nozzle to the burner, and mixed with the fuel. Then, the mixture of the fuel and the primary air is combusted together with secondary air sucked into an exit of the burner by an inducer. However, in terms of flame stability, there is a problem in that it is difficult to increase a Top Down Ratio (TDR), which is a ratio of maximum thermal power to minimum thermal power of the gas furnace.

International Patent Application. WO 2005-095870 A1 (published on Oct. 13, 2005) discloses a gas furnace in which a plurality of burners are classified into two groups and thermal power of each group is independently controlled.

Specifically, a manifold of the gas furnace is divided into two sections by a separator plate, and each of the two sections communicates with each of the two groups. In addition, the gas furnace has a first gas valve for supplying fuel to one of the two sections, and a second gas valve for supplying fuel to the other of the two sections. That is, the above gas furnace controls the thermal power of the respective groups individually by using the first gas valve and the second gas valve, and adjusts the thermal power of the gas furnace stepwise.

In this case, in order to reduce the thermal power of the gas furnace, the opening degree of the respective gas valves may be reduced, or any one of the gas valves may be closed with the other one being opened so as to supply fuel to some of the burners.

However, this control is a control to reduce the amount of fuel supplied to each burner or the number of burners to which fuel is supplied, while the minimum thermal power of each burner is fixed, so there is a limitation in reducing the thermal power of the gas furnace. Here, the burner of the gas furnace is an in-shot burner in which primary air introduced into an entry of a burner and secondary air introduced into an exit of the burner participate in a combustion process, as similarly as in the above-mentioned US patents, and the burner is designed to have a specific minimum thermal power.

SUMMARY OF THE DISCLOSURE

An aspect of the present disclosure is to solve the above-described problems and other problems.

Another aspect of the present disclosure provides a gas furnace capable of providing a user with thermal comfort and reducing heating cost and energy by implementing a high Top Down Ratio (TDR).

Yet another aspect of the present disclosure provides a gas furnace capable of changing a shape of a flame according to a required thermal power.

Yet another aspect of the present disclosure provides a mechanism capable of allowing or blocking introduction of primary air to a burner.

Yet another aspect of the present disclosure provides various methods for controlling the above mechanism according to the required firepower.

According to an aspect of the present disclosure, there is provided a gas furnace including: a burner for burning fuel; a manifold providing the fuel to an entry of the burner; a heat exchanger spaced apart from an exit of the burner and providing a passage for combustion gas generated by the burner; an inducer for causing a fluid to flow through the burner and the heat exchanger; a blower for causing a flow of air passing around the heat exchanger; and an air shutter positioned between the manifold and the entry of the burner.

According to another aspect of the present disclosure, the air shutter may include: a housing having an inner space that communicates with the manifold and the entry of the burner; and a primary hole formed to penetrate the housing and able to be opened and closed.

According to another aspect of the present disclosure, the gas furnace may further include: a nozzle having one side coupled to the manifold and the other side coupled to the housing.

According to another aspect of the present disclosure, the nozzle may face the entry of the burner, and the primary hole may be positioned between the nozzle and the entry of the burner.

According to another aspect of the present disclosure, the burner may include a plurality of burners spaced apart from each other, and the housing may extend in a direction in which the plurality of burners is spaced apart from each other.

According to another aspect of the present disclosure, the primary hole may include: a plurality of primary holes spaced apart from each other in a longitudinal direction of the housing.

According to another aspect of the present disclosure, the plurality of primary holes may be simultaneously opened or closed.

According to another aspect of the present disclosure, the plurality of primary holes may further include a plurality of lower holes formed to penetrate one side of the housing and provided in a number equal to a number of the plurality of burners.

According to another aspect of the present disclosure, the air shutter may include: a first rack coupled to the one side of the housing to be movable in the longitudinal direction of the housing, the first rack having a plurality of first holes that is formed to penetrate the first rack and spaced apart from each other at intervals identical to intervals between the plurality of lower holes.

According to another aspect of the present disclosure, the plurality of primary holes may further include a plurality of upper holes formed to penetrate the other side of the housing and facing the plurality of lower holes.

According to another aspect of the present disclosure, the air shutter includes: a second rack coupled to the other side of the housing to be movable in the longitudinal direction of the housing, the second rack having a plurality of second holes that are formed to penetrate the second rack and spaced apart from each other at intervals identical to intervals between the plurality of upper holes.

According to another aspect of the present disclosure, the first rack and the second rack may be movably coupled to an inside of the housing.

According to another aspect of the present disclosure, the air shutter may include: a rotary motor located outside the housing and having a rotational shaft penetrating the housing; and a pinion fixed to the rotational shaft of the rotary motor and engaged with the first rack and the second rack at a position between the first rack and the second rack. The pinion may be rotatable in a first rotational direction or in a second rotational direction opposite to the first rotational direction.

According to another aspect of the present disclosure, a length of the first rack may be greater than a length of the second rack, and a number of the plurality of first holes may be greater than a number of the plurality of second holes.

According to another aspect of the present disclosure, the pinion may be rotatable stepwise.

According to another aspect of the present disclosure, the gas furnace includes: a fuel valve providing the fuel to the manifold; and a controller configured to control the rotary motor, the fuel valve, and the inducer.

According to another aspect of the present disclosure, the controller may be further configured to, in response to a required load being greater than a first load but less than a maximum load, control the rotary motor so as to fully open the plurality of lower holes and the plurality of upper holes. In addition, the controller may be further configured to control an opening degree of the fuel valve and a revolution per minute (RPM) of the inducer to correspond to the required load.

According to another aspect of the present disclosure, the controller may be further configured to: in response to the required load being less than or equal to the first load, control the rotary motor so as to fully close at the plurality of lower holes and the plurality of upper holes. In addition, the controller may be further configured to control an opening degree of the fuel valve and a revolution per minute (RPM) of the inducer to correspond to the required load.

According to another aspect of the present disclosure, the controller may be further configured to: in response to the required load being greater than the second load but less than the first load, control the rotary motor so as to partially open the plurality of lower holes and the plurality of upper holes. In addition, the controller may be further configured to control an opening degree of the fuel valve and a revolution per minute (RPM) of the inducer to correspond to the required load.

According to another aspect of the present disclosure, the controller may be further configured to: in response to the required load being less than or equal to the second load, control the rotary motor so as to fully close at the plurality of lower holes and the plurality of upper holes. In addition, the controller may be further configured to control an opening degree of the fuel valve and a revolution per minute (RPM) of the inducer to correspond to the required load.

According to another aspect of the present disclosure, the housing may include: a first housing opened upward; and a second housing opened downward and detachably coupled to the first housing.

According to another aspect of the present disclosure, the gas furnace may further include: a first shell extending along the first housing and coupled to one side of the first housing, the first shell having a plurality of lower parts that are formed by being pressed from an upper surface of the first sell and are spaced apart from each other in a longitudinal direction of the first shell.

In addition, the gas furnace may further include: a second shell extending along the second housing and coupled to one side of the second housing, the second shell having a plurality of upper parts that are formed by being pressed upward from a lower surface of the second shell and spaced apart from each other in a longitudinal direction of the second shell and face the plurality of lower parts.

In addition, the plurality of burners may include: the plurality of lower parts; and the plurality of upper parts.

According to another aspect of the present disclosure, the first shell may further include: a first flange that is a portion of the first shell other than the plurality of lower parts.

The second shell may further include: a second flange that is a portion of the second shell other than the plurality of upper parts and detachably coupled to the first flange.

In addition, the flame propagation port may be formed in a portion between the first flange and the second flange positioned between the plurality of burners.

According to another aspect of the present disclosure, the gas furnace may further include: an igniter adjacent to an exit of a burner positioned at one end of the plurality of burners.

According to another aspect of the present disclosure, the gas furnace may further include: a flame detector adjacent to an exit of a burner positioned at the other end of the plurality of burners.

According to another aspect of the present disclosure, each of the plurality of burners may further include: a venturi portion forming an entry of each of the plurality of burners; a head portion forming an exit of each of the plurality of burners; and a retainer inserted into the head portion.

According to another aspect of the present disclosure, there is provided an air conditioner having an outdoor unit and a ventilator connected to each other through a refrigerant pipe. The ventilator may include: an air supply fan for causing a flow of air along an air supply passage; an exhaust fan for causing a flow of air along an exhaust passage separated from the air supply passage; a plurality of coils located in the air supply passage and having refrigerant flowing therethrough; and a gas furnace positioned downstream of the plurality of coils in the air supply passage.

A gas furnace and an air conditioner having the same according to the present disclosure may have effects as below.

According to at least one of the embodiments of the present disclosure, it is possible to adjust the intensity of thermal power stepwise by adjusting an opening degree of a fuel valve.

According to at least one of the embodiments of the present disclosure, by using an air shutter to convert the characteristics of a flame from a partially premixed flame in which primary air and secondary air participate in combustion to a diffuse flame in which only secondary air participates in combustion, it is possible to realize a high Top Down Ratio (TDR). That is, it is possible to provide a gas furnace capable of providing thermal comfort to a user and reducing cost and energy.

According to at least one of the embodiments of the present disclosure, it is possible to control opening and closing of a primary hole of an air shutter. That is, a gas furnace capable of changing a shape of a flame according to a required thermal power may be provided.

According to at least one of the embodiments of the present disclosure, it is possible to open or close a primary hole of an air shutter by use of movement of a rack in the air shutter. That is, a mechanism for allowing or blocking the introduction of primary air to a burner through a primary hole of an air shutter may be provided.

According to at least one of the embodiments of the present disclosure, it is possible to control a movement direction of a rack connected to a rotary motor by using the rotary motor. That is, various methods for controlling the above mechanism may be provided according to a required thermal power.

According to at least one of the embodiments of the present disclosure, an opening degree of a primary hole of an air shutter may be adjusted. That is, a shape of a flame may be changed stepwise according to a required thermal power.

According to at least one of the embodiments of the present disclosure, a plurality of shell-type burners formed integrally with the air shutter as one body may be provided.

According to at least one of the embodiments of the present disclosure, a flame propagation port may be formed between the plurality of burners. That is, the number of igniters and flame detectors provided in the plurality of burners may be minimized.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

FIGS. 1 and 2 are views showing an internal configuration of an air conditioner according to an embodiment of the present disclosure.

FIGS. 3 and 4 are views showing a gas furnace according to an embodiment of the present disclosure.

FIG. 5 is an exploded perspective view of an air shutter according to an embodiment of the present disclosure.

FIG. 6 is an enlarged view of a portion of an air shutter and a burner according to an embodiment of the present disclosure.

FIG. 7 is a perspective view of a shutter assembly of an air shutter according to an embodiment of the present disclosure.

FIG. 8 is a control configuration diagram of a gas furnace according to an embodiment of the present disclosure.

FIG. 9 is a flowchart illustrating a method for controlling a gas furnace according to an example of the present disclosure.

FIGS. 10 and 11 are views showing a state in which a primary hole of an air shutter is opened according to an embodiment of the present disclosure.

FIGS. 12 and 13 are views showing a state in which a primary hole of an air shutter is closed according to an embodiment of the present disclosure.

FIG. 14 is a flowchart of a method for controlling a gas furnace according to another example of the present disclosure.

FIG. 15 is a view illustrating a state in which a primary hole of an air shutter is partially opened according to an embodiment of the present disclosure.

DESCRIPTION OF EXEMPLARY EMBODIMENTS

Hereinafter, the embodiments disclosed in the present specification will be described in detail with reference to the accompanying drawings, but the same or similar components are assigned the same reference numerals regardless of reference numerals, and redundant description thereof will be omitted.

The suffixes "module" and "part" for components used in the following description are given or mixed in consideration of only the ease of writing the specification, and do not have distinct meanings or roles by themselves.

In addition, in describing the embodiments disclosed in the present specification, if it is determined that detailed descriptions of related known technologies may obscure the gist of the embodiments disclosed in this specification, the detailed description thereof will be omitted. In addition, the accompanying drawings are only for easy understanding of the embodiments disclosed in the present specification, and the technical spirit disclosed in the present specification is not limited by the accompanying drawings, and all changes included in the spirit and scope of the present disclosure, should be understood to include equivalents or substitutes.

Terms including ordinal numbers such as first, second, etc. may be used to describe various elements, but the elements are not limited by the terms. The above terms are used only for the purpose of distinguishing one component from another.

When a component is referred to as being "connected" or "connected" to another component, it may be directly connected or connected to the other component, but it is understood that other components may exist in between. On the other hand, when it is said that a certain component is "directly connected" or "directly connected" to another component, it should be understood that the other component does not exist in the middle.

A singular expression includes a plural expression unless the context clearly dictates otherwise.

In the following description, even if an embodiment is described with reference to specific figure, a reference numeral not indicated in the specific figure may be referred to if necessary, and the reference numeral not indicated in the specific figure may be used when indicated in the other figure.

The directions of upward (U, y), downward (D), leftward (Le, x), rightward (Ri), forward (F, z), and rear direction (R) indicated in FIG. 2 are used for convenience of explanation, and the technical spirit of the present disclosure is not limited thereby.

Referring to FIGS. 1 and 2, an air conditioner 1 may include an outdoor unit 20 and a ventilator 10. The outdoor unit 20 may include a compressor (not shown) for compressing refrigerant and an outdoor heat exchanger (not shown) for performing heat exchange between refrigerant and outdoor air. The outdoor unit 20 may be connected to the ventilator 10 through a refrigerant pipe 11a. The refrigerant may circulate the outdoor unit 20 and the ventilator 10 through the refrigerant pipe. A housing 10H of the ventilator 10 may form the exterior of the ventilator 10.

The housing 10H may include a first long side LS1 and a second long side LS2 opposite to the first long side LS1. The first long side LS1 and the second long side LS2 may be collectively referred to as a long side LS1 and LS2. The housing 10H may include a first short side SS1 adjacent to the long side LS1 and LS2 and a second short side SS2 opposite the first short side SS1. The first short side SS1 and the second short side SS2 may be collectively referred to as a short side SS1 and SS2.

A direction vertically to the long side LS1 and LS2 and the short side SS1 and SS2 may be referred to as a first direction DR1 or a left-right direction. A direction parallel to the short side SS1 and SS2 may be referred to as a second direction DR2 or an up-down direction. A direction parallel to the long side LS1 and LS2 may be referred to as a third direction DR3 or a front-rear direction.

A side of the first long side LS1 may be referred to as an upper side (U, y), and a side of the second long side LS2 may be referred to as a lower side (D). A side of the first short side SS1 may be referred to as a front side (F, z), and a side of the second short side SS2 may be referred to as a rear side (R). In the first direction DR1, a direction toward one end of the short side SS1 and SS2 may be referred to as a left side (Le, x), and a direction toward the other end of the short side SS1 and SS2 may be referred to as a right side (Ri).

The ventilator 10 may include a refrigerant distributor 11, a plurality of heat exchangers 12, 13, 14, 15, and 19, a blower 16, a partition 17, and an exhaust fan 18. The refrigerant distributor 11, the plurality of heat exchangers 12, 13, 14, 15, and 19, the blower 16, the partition 17, and the exhaust fan 18 may be installed inside the housing 10H.

An air supply passage OA-SA may be formed between a first inlet 10i and a first outlet (not shown). The first inlet 10i may be formed to penetrate the second short side SS2 and may be adjacent to the first long side LS1. The first outlet may be formed to penetrate the second long side LS2 and may be adjacent to the first short side SS1. Outdoor air OA may be introduced into the first inlet 10i, and the first inlet 10i may be referred to as an outdoor air inlet. Supply air SA may be supplied into a room through the first outlet, and the first outlet may be referred to as a supply air outlet.

The blower 16 may be adjacent to the first outlet and located in the air supply passage OA-SA. The blower 16 may cause a flow of air along the air supply passage OA-SA. The blower 16 may be referred to as an air supply fan or a plug fan. Meanwhile, an air supply duct (not shown) may be connected to the second long side LS2 and may communicate with the first outlet and the indoor space. For example, the air volume per minute of the blower 16 may be 3,000 to 5,000 cubic feet per minute (CFM).

The exhaust passage RA-EA may be formed between the second inlet 10p and the second outlet 10g. The second inlet 10p may be formed to penetrate the second long side LS2 and may be spaced apart from the first outlet. The second outlet 10g may be formed through the second short side SS2 and may be adjacent to the second long side LS2. The indoor air RA (room air, or return air) may be introduced into the second inlet 10p, and the second inlet 10p may be referred to as an indoor air inlet. Exhaust air EA may be discharged to the outside through the second outlet 10g, and the second outlet 10g may be referred to as an exhaust outlet.

The exhaust fan 18 may be located in the exhaust passage RA-EA adjacent to the second discharge port 10g. The exhaust fan 18 may cause a flow of air along the exhaust passage RA-EA. The exhaust fan 18 may be referred to as a blower or a plug fan. On the other hand, the inner duct (not shown) may be connected to the second long side LS2, it may be in communication with the second inlet 10p and the indoor space.

The partition wall 17 may divide the inner space of the housing 10H into a space in which the air supply passage OA-SA is formed and a space in which the exhaust passage RA-SA is formed. The partition wall 17 may be installed near the second inlet 10p of the housing 10H, and may include an inclined portion (unsigned) and a horizontal portion (unsigned). Accordingly, the air supply passage OA-SA may be located above the partition wall 17, and the exhaust passage RA-SA may be located below the partition wall 17.

The refrigerant distributor 11 may be adjacent to the first long side LS1 and the first short side SS1. One side of the refrigerant distributor 11 may be connected to the refrigerant pipe (11a). The other side of the refrigerant distributor 11 may be connected to a plurality of pipes 11b, 11c, 11d, and 11e. For example, the refrigerant distributor 11 may open and close the passage of each pipe through a solenoid valve. Here, each pipe 11b, 11c, 11d, or 11e may include a refrigerant pipe providing a passage of refrigerant supplied to each heat exchanger 12, 14, 15, or 19, and a refrigerant pipe providing a passage of refrigerant passing through each heat exchanger 12, 14, 15, or 19. In addition, each expansion valve (not shown) may expand the refrigerant flowing through each of the pipes 11b, 11c, 11d, and 11e. For example, the expansion valve may be an Electronic Expansion Valve (EEV) capable of adjusting the opening degree. In this case, when the expansion valve is fully opened, the expansion valve may not expand the refrigerant.

The preheater 12 may be located in the air supply passage OA-SA adjacent to the first inlet 10i. A preheater 12 may be disposed vertically within the housing 10H. A first pipe 11b may provide a refrigerant passage connecting the refrigerant distributor 11 and the preheater 12. Accordingly, the preheater 12 may heat air introduced into the first inlet 10i. The preheater 12 may be referred to as a preheat coil.

The heat exchanger 14 may be located downstream of the preheater 12 in the air supply passage OA-SA. The heat exchanger 14 may be vertically disposed within the housing 10H. A size of the heat exchanger 14 may be larger than a size of the preheater 12. The second pipe 11c may provide a refrigerant passage connecting the refrigerant distributor 11 and the heat exchanger 14. The heat exchanger 14 may be referred to as a main heat exchanger or a cooling/heating coil.

A reheater 15 may be located downstream of the heat exchanger 14 in the air supply passage OA-SA. The reheater 15 may be vertically disposed within the housing 10H. A size of the reheater 15 may be smaller than a size of the heat exchanger 14. The third pipe 11d may provide a refrigerant passage connecting the refrigerant distributor 11 and the reheater 15. The reheater 15 may be referred to as a reheat coil. Meanwhile, the reheater 15 may be operated based on a set indoor temperature and a set humidity. The reheater 15 may face the blower 16 with respect to a base 10W on which the reheater 15 is installed.

A recovery coil 19 may be located in an exhaust passage RA-EA adjacent to the exhaust fan 18. The recovery coil 19 may be vertically disposed within the housing 10H. A fourth pipe 11e may provide a refrigerant passage connecting the refrigerant distributor 11 and the recovery coil 19. Meanwhile, a heat transfer direction of the recovery coil 19 to air may be opposite to a heat transfer direction of the heat exchanger 14 to air.

A part of the recovery wheel 13 may be located in the air supply passage OA-SA between the preheater 12 and the heat exchanger 14, and the other part of the recovery wheel 13 may be located in the exhaust passage RA-EA between the recovery coil 19 and the inclined portion of the partition wall 17. The recovery wheel 13 may be referred to as an energy recovery wheel (ERW).

In this case, the recovery wheel 13 may have a flat cylinder shape as a whole. A honeycomb structure may be formed inside the recovery wheel 13, and air may pass through the honeycomb structure. The recovery wheel 13 may be rotated at a low speed. Accordingly, the recovery wheel 13 may recover sensible heat and latent heat by using temperature difference and humidity difference between the outdoor air OA and the indoor air RA.

Referring to FIGS. 2 and 3, the blower 16 may include a motor 16a, a hub 16b, a shroud 16c, and a plurality of blades 16d. The hub 16b, the shroud 16c, and the plurality of blades 16d may be collectively referred to as an impeller 16a, 16b, and 16c.

The motor 16a may provide a rotational force. The motor 16a may be a centrifugal fan motor. The motor 16a may form a front end of the blower 16, and a rotational shaft of the motor 16a may extend rearward from the motor 16a. A longitudinal direction of the rotational shaft of the motor 16a may be referred to as an axial direction of the blower 16.

The hub 16b may be located at the rear of the motor 16a and may be fixed to the rotational shaft of the motor 16a. The hub 16b may have a disk shape.

The shroud 16c may be located at the rear of the hub 16b and may have a ring plate shape. The shroud 16c may be rotatably coupled to the base 10W. For example, an inlet (unsigned) may be fixed to a front surface of the base 10W between the shroud 16c and the base 10W, and may have a hyperbolic cylinder or funnel shape. In this case, the shroud 16c may be rotatably coupled to the inlet. A hole formed inside the shroud 16c, an inner space of the inlet, and a hole (not shown) formed in the base 10W may communicate with one another and be located in the air supply passage OA-SA (see FIG. 1).

The plurality of blades 16d may be located between an inner periphery and an outer periphery of the ring-shaped shroud 16c. The plurality of blades 16d may be coupled to the hub 16b and the shroud 16c between the hub 16b and the shroud 16c. The plurality of blades 16d may be formed integrally with the shroud 16c and the hub 16b.

In addition, the plurality of blades 16d may be spaced apart from each other in a rotating direction of the rotational shaft of the motor 16a. Each of the plurality of blades 16d may be convexly curved in the rotating direction of the rotational shaft (see FIGS. 4 and 5). Among the plurality of blades 16d, a blade positioned close to a mount plate 110 to be described later may be convex toward the mount plate 110.

Accordingly, when the impeller 16a, 16b, and 16c is rotated in a clockwise direction in response to driving of the motor 16a, air may be introduced in an axial direction of the blower 16 through a hole of the base 10W and may be pressed by the plurality of blades 16d to be discharged in a radial direction of the blower 16. In this case, a flow of air discharged by the blower 16 may be concentrated on the left side of the blower 16 rather than the right side of the blower 16.

A horizontal plate 10a may be vertically disposed on a front surface of the base 10W, and may be coupled to the front surface of the base 10W. The horizontal plate 10a may be located above the blower 16. The horizontal plate 10a may be referred to as a first horizontal wall or a first panel. Meanwhile, a frame 16e may form a skeleton of the blower 16, and a motor mount 1600 on which the motor 16a is mounted may be coupled to the frame 16a. The frame 16e may be coupled to the bottom of the horizontal plate 10a.

A top plate 10b may be disposed vertically to the front surface of the base 10W, and may be coupled to the front surface of the base 10W. The top plate 10b may be located below of the blower 16. The top plate 10b may be referred to as a second horizontal wall or a second panel. A top hole 100a may be formed to penetrate the top plate 10b in the up-down direction. The top hole 100a may be formed to be long in the left-right direction. In the up-down direction, at least a portion of the top hole 100a may overlap the blower 16.

A bottom plate 10c may be disposed vertically to the front surface of the base W, and may be coupled to the front surface of the base 10W. The bottom plate 10c may face the horizontal plate 10a with respect to the top plate 10b. The bottom plate 10c may form a part of the second long side LS2 of the housing 10H. The bottom hole 100b may be formed to penetrate the bottom plate 10c in the up-down direction. The bottom hole 100b may be formed to be long in the left-right direction. In the up-down direction, the bottom hole 100b may face the top hole 100a.

The side plate 10d may be disposed vertically to the front surface of the base W, and may be coupled to the front surface of the base W. The side plate 10d may be coupled to a right side of the horizontal plate 10a, a right side of the top plate 10b, and a right side of the bottom plate 10c. A side hole 100c may be formed to penetrate the side plate 10d in the left-right direction. The side hole 100c may be formed to be long in the front-rear direction. The side hole 100c may be located between a right side of the top plate 10b and a right side of the bottom plate 10c.

The mount plate 110 may include a first plate 111 and a second plate 112. The first plate 111 may be vertically disposed on the front surface of the base W and an upper surface of the bottom plate 10c, and may be coupled to the front surface of the base W and the upper surface of the bottom plate 10c. The first plate 111 may be coupled to a left side of the top plate 10b. The second plate 112 may extend obliquely in a direction away from the blower 16 from an upper end of the first plate 111. In this case, a left side of the base 10W, a left side of the horizontal plate 10a, a left side of the second plate 112, and a left side of the bottom plate 10c may be connected to a left side of the housing 10H.

A first space 101S may be formed between the horizontal plate 10a and the top plate 10b. A vertical plate (not shown) may be connected to a front end of the horizontal plate 10a and a front end of the top plate 10b, and may close a front side of the first space 101S. The first space 101S may communicate with the top hole 100a.

A second space 102S may be formed between the top plate 10b and the bottom plate 10c. The vertical plate may be connected to a front end of the top plate 10b and a front end of the bottom plate 10c, and may close the front side of the second space 102S. The second space 102S may communicate with the bottom hole 100b and the side hole 100c.

For example, the bottom hole 100b may be opened, and the side hole 100c may be closed. The side hole 100c may be closed by a detachable cover (not shown) or may not be initially formed in the side plate 10d.

In another example, the bottom hole 100b may be closed, and the side hole 100c may be opened. The bottom hole 100b may be closed by a detachable cover (not shown) or may not be initially formed in the bottom plate 10c.

Referring to FIGS. 3 and 4, the gas furnace 100 may include a fuel valve 120, a manifold 130, a burner 140, a heat exchanger 150, a collect box 160, and an inducer 170.

The fuel valve 120 may supply fuel from a fuel pipe FP connected to a fuel source (not shown) to the manifold 130, or may block the supply of the fuel to the manifold 130. For example, the fuel may be Liquefied Natural Gas (LNG) or Liquefied Petroleum Gas (LPG). Meanwhile, by adjusting an opening degree of the fuel valve 120, it is possible to adjust an amount of the fuel supplied to the manifold 130.

The burner 140 may receive the fuel from the manifold 130. The burner 140 may burn the fuel. When the fuel is burned, a flame and high-temperature combustion gas may be generated. For example, the burner 140 may be provided in plural. A plurality of burners 140 may be installed inside a burner box 1400. The burner box 1400 may be installed to the left of the first plate 111 of the mount plate 110.

An igniter 1401 may be mounted in the burner box 1400, and may be adjacent to an exit of a burner located at one end of the plurality of burners 140. For example, the igniter 1401 may be adjacent to an exit 146e of a sixth burner 146, which will be described later, and may burn the fuel that has passed through the sixth burner 146 (see FIG. 10). A flame formed at the exit 146e of the sixth burner 146 may be propagated to exits 145e, 144e, 143e, 142e, and 141e of remaining burners 145, 144, 143, 142, and 141. The propagated flame may burn the fuel that has passed through the remaining burners 145, 144, 143, 142 and 141 (see FIG. 10).

A flame detector 1402 may be mounted to the burner box 1400 and may be adjacent to an exit of a burner located at the other end of the plurality of burners 140. For example, the flame detector 1402 may be adjacent to an exit 141e of a first burner 141, which will be described later, and may detect whether a flame is formed at the exit 141e of the first burner 141 (see FIG. 10). When the flame detector 1402 detects the flame of the first burner 141, it is considered that a flame is formed in the remaining burners 142, 143, 144, 145, and 146 as a result of combustion due to the characteristics of the flame propagation described above.

An air shutter 190 may be positioned between the manifold 130 and the burner 140. The air shutter 190 may be in the shape of a box elongated in a front-rear direction as a whole. Fuel of the manifold 130 may be delivered to the burner 140 through the air shutter 190.

The heat exchanger 150 may be located in the second space 102S between the top plate 10b and the bottom plate 10c. The heat exchanger 150 may provide a passage for the combustion gas. One end of the heat exchanger 150 may be coupled to the right of the first plate 111 of the mount plate 110. The other end of the heat exchanger 150 may be spaced apart from the one end of the heat exchanger 150, and may be coupled to the right of the first plate 111.

In addition, the heat exchanger 150 may be provided in plural. The number of heat exchangers 150 may be equal to the number of burners 140. The plurality of heat exchangers 151, 152, 153, 154, 155, and 156 may be connected to the plurality of burners 140, respectively. The plurality of heat exchangers 151, 152, 153, 154, 155, and 156 may be spaced apart from each other in the front-rear direction.

In addition, the heat exchanger 150 may be a tubular type heat exchanger. The heat exchanger 150 may include a first tube 150a, a bend 150b, and a second tube 150c. The passage of the combustion gas may be formed in the inside of the first tube 150a, the inside of the bend 150b, and the inside of the second tube 150c. For example, a diameter of the first tube 150a may be substantially equal to a diameter of the bend 150b and a diameter of the second tube 150c.

The first tube 150a may be elongated in the left-right direction. A left end of the first tube 150a may form the one end of the heat exchanger 150, and may be referred to as an entry of the heat exchanger 150. The entry of the heat exchanger 150 may communicate with the burner 140 through a first hole 111a. Here, the first hole 111a may be formed to penetrate the first plate 111 in the left-right direction, and may be located between the entry of the heat exchanger 150 and the burner 140. Meanwhile, the entry of the heat exchanger 150 may be spaced apart from the burner 140. That is, air may be introduced into the burner 140 between the entry of the heat exchanger 150 and the burner 140, and the air may be referred to as secondary air.

The second tube 150c may be elongated in the left-right direction. The second tube 150c may be spaced upward from the first tube 150a. A left end of the second tube 150c may form the other end of the heat exchanger 150, and may be referred to as an exit of the heat exchanger 150. The exit of the heat exchanger may communicate with the inside of the collect box 160, which will be described later, through the second hole 111b. Here, the second hole 111b may be formed to penetrate the first plate 111 in the left-right direction, and may be located between the exit of the heat exchanger 150 and the collect box 160.

The bend 150b may be connected to a right end of the first tube 150a and a right end of the second tube 150c. The bend 150b may be convex to the right. The bend 150b may transfer combustion gas passing through the first tube 150a to the second tube 150c. Accordingly, the combustion gas may flow to the right in the first tube 150a, and may flow to the left in the second tube 150b. The bend 150b may be referred to as a U-shaped bend.

Meanwhile, according to an embodiment, a bend connected to the left end of the second tube 150c and convex to the left, and a tube connected to the bend and disposed in parallel with the second tube 150c may be added.

The collect box 160 may be located above the burner box 1400, and may be installed to the left of the first plate 111 of the mount plate 110. The combustion gas passing through the heat exchanger 150 may be introduced into the inside of the collect box 160.

The inducer 170 may be installed to the left of the collect box 160. The entry of the inducer 170 may communicate with the inside of the collect box 160. The exit 171 of the inducer 170 may be connected to an exhaust pipe 180 (see FIG. 2). The inducer 170 may cause the combustion gas to flow through the heat exchanger 150, the collector box 160, the inducer 170, and the exhaust pipe 180. In addition, the inducer 170 may cause the fluid to flow through the burner 140. The inducer 170 may be referred to as a fan, a blower, or an induced draft motor (IDM).

The exhaust pipe 180 (see FIG. 2) may extend upward from the exit 171 of the inducer 170. The exhaust pipe 180 may penetrate the second plate 112, the horizontal plate 10a, and the first long side LS1 of the mount plate 110, and may discharge the combustion gas to the outside. The combustion gas flowing through the exhaust pipe 180 may be referred to as exhaust gas.

Accordingly, the air discharged from the blower 16 may pass around the heat exchanger 150 through the top hole 100a, and may be supplied into an indoor space through the bottom hole 100b or the side hole 100c. In this case, the air passing around the heat exchanger 150 may receive thermal energy from the combustion gas flowing along the heat exchanger 150. That is, the temperature of the air may be increased while the air passes around the heat exchanger 150.

Meanwhile, the gas furnace 100 may include a roll-out switch, a limit switch, a pressure switch, and the like.

Referring to FIGS. 5 and 6, the air shutter 190 may include a first housing 191 and a second housing 192. For example, the first housing 191 may be detachably coupled to the second housing 192. The first housing 191 and the second housing 192 may be collectively referred to as a housing 191 and 192.

The first housing 191 may be elongated in the front-rear direction and may be opened upward. A plurality of lower grooves (unsigned) may be formed by being recessed downward from an upper end of a left side of the first housing 191.

The second housing 191 may be elongated in the front-rear direction and may be opened downward. A plurality of upper grooves (unsigned) may be formed by being recessed upward from a lower end of a left side of the second housing 192.

In addition, the upper end of the first housing 191 may contact the lower end of the second housing 192. An inner space of the housing 191 and 192 may be formed between the first housing 191 and the second housing 192. The inner space of the housing 191 and 192 may be referred to as an air buffer room. For example, the first housing 191 and the second housing 192 may be symmetrical to each other in the up-down direction.

A plurality of insertion holes h may be formed between the plurality of lower grooves and the plurality of upper grooves. A plurality of nozzles 131, 132, 133, 134, 135, and 136 may be connected to the manifold 130 and the housing 191 and 192 between the manifold 130 and the housing 191 and 192 (see FIG. 4). That is, one ends of the plurality of nozzles 131, 132, 133, 134, 135 and 136 may be inserted into the manifold 130, and the other ends of the plurality of nozzles 131, 132, 133, 134, 135, and 136 may be respectively inserted into the plurality of insertion holes h1, h2, h3, h4, h5, and h6 (see FIG. 11). In this case, the number of nozzles 131, 132, 133, 134, 135, and 136 and the number of holes h1, h2, h3, h4, h5, and h6 may be equal to the number of burners 140.

A first shell 140*a* may be elongated along the first housing 191. The first shell 140*a* may be coupled to a right side of the first housing 191. For example, the first shell 140*a* may be formed integrally with the first housing 191 as one body. In this case, the first shell 140*a* and the first housing 191 may be collectively referred to as a first part. In another example, the first shell 140*a* may be provided separately from the first housing 191, and may be coupled to the first housing 191 by welding or the like.

In addition, the plurality of lower parts 141*a*, 142*a*, 143*a*, 144*a*, 145*a*, and 146*a* may be formed by being pressed downward from an upper surface of the first shell 140*a*, and may be spaced apart from each other in the front-rear direction. Meanwhile, a portion of the first shell 140*a* other than the plurality of lower parts 141*a*, 142*a*, 143*a*, 144*a*, 145*a*, and 146*a* may be formed entirely flat, and may be referred to as a first flange.

A second shell 140*b* may be elongated along the second housing 192. The second shell 140*b* may be coupled to a right side of the second housing 192. For example, the second shell 140*b* may be formed integrally with the second housing 192 as one body. In this case, the second shell 140*b* and the second housing 192 may be collectively referred to as a second part. In another example, the second shell 140*b* may be provided separately from the second housing 192, and may be coupled to the second housing 192 by welding or the like.

In addition, a plurality of upper parts 141*b*, 142*b*, 143*b*, 144*b*, 145*b*, and 146*b* may be formed by being pressed upward from a lower surface of the second shell 140*b*, and may be spaced apart from each other in the front-rear direction. Meanwhile, a portion of the second shell 140*b* other than the plurality of upper parts 141*b*, 142*b*, 143*b*, 144*b*, 145*b*, and 146*b* may be formed entirely flat, and may be referred to as a second flange.

In addition, in the up-down direction, the second shell 140*b* may face the first shell 140*a*, and the second flange may be coupled to the first flange. In this case, a plurality of burners 141, 142, 143, 144, 145, and 146 may include the plurality of upper parts 141*b*, 142*b*, 143*b*, 144*b*, 145*b*, 146*b* and the plurality of lower parts 141*a*, 142*a*, 143*a*, 144*a*, 145*a*, and 146*a*. Meanwhile, a flame propagation port (not shown) may be formed in a portion between the first flange and the second flange positioned between the plurality of burners 141, 142, 143, 144, 145, and 146.

An entry 140*i* of each of the plurality of burners 141, 142, 143, 144, 145, and 146 may be formed on a right side of the housing 191 and 192, and may face a corresponding one of the plurality of nozzles 131, 132, 133, 134, 135, and 136. An exit 140*e* of each of the plurality of burners 141, 142, 143, 144, 145, and 146 may be connected to an entry of a corresponding one of the plurality of heat exchangers 151, 152, 153, 154, 155, and 156 through a plurality of first holes 111*a* (see FIG. 4).

For example, each of the plurality of burners 141, 142, 143, 144, 145, and 146 may include a venturi portion 140*v* forming an entry 140*i* of a corresponding burner, and a head portion 140*h* forming an exit 140*e* of the corresponding burner. For example, ribs 140*r* and ribs may be formed by being recessed inward of the head portion 140*h* from a side surface of the head portion 140*h*. For example, a retainer (not shown) may be inserted into the head portion 140*h* and seated on the ribs 140*r*, and a flame described above or to be described later may be seated on the retainer.

Specifically, the first burner 141 may include a first upper part 141*b* and a first lower part 141*a*, and may be spaced apart from a first nozzle 131 while facing the same. The second burner 142 may include a second upper part 142*b* and a second lower part 142*a*, and may be spaced apart from the second nozzle 132 while facing the same. The third burner 143 may include a third upper part 143*b* and a third lower part 143*a*, and may be spaced apart from the third nozzle 133 while facing the same. The fourth burner 144 may include a fourth upper part 144*b* and a fourth lower part 144*a*, and may be spaced apart from the fourth nozzle 134 while facing the same. The fifth burner 145 may include a fifth upper part 145*b* and a fifth lower part 145*a*, and may be spaced apart from the fifth nozzle 135 while facing the same. The sixth burner 146 may include a sixth upper part 146*b* and a sixth lower part 146*a*, and may be spaced apart from the sixth nozzle 136 while facing the same.

Accordingly, fuel injected from the plurality of nozzles 131, 132, 133, 134, 135 and 136 may pass through the inner space of the housing 191 and 192 and be then supplied to the plurality of burners 141, 142, 143, 144, 145, and 146.

Referring to FIGS. 5 and 7, a plurality of lower holes 191*a*, 191*b*, 191*c*, 191*d*, 191*e*, and 191*f* may be formed to penetrate a lower side of the first housing 191 in the up-down direction, and may be spaced apart from each other in the front-rear direction. The number of lower holes 191*a*, 191*b*, 191*c*, 191*d*, 191*e*, and 191*f* may be equal to the number of burners 141, 142, 143, 144, 145, and 146. A plurality of upper holes 192a, 192b, 192c, 192d, 192e, and 192f may be formed to penetrate an upper side of the second housing 192 in the up-down direction, and may be spaced apart from each other in the front-rear direction. The number of upper holes 192a, 192b, 192c, 192d, 192e, and 192f may be equal to the number of burners 141, 142, 143, 144, 145, and 146.

In the up-down direction, the plurality of upper holes 192a, 192b, 192c, 192d, 192e, and 192f may face the plurality of lower holes 191a, 191b, 191c, 191d, 191e, and 191f In the left-right direction, the plurality of upper holes 192a, 192b, 192c, 192d, 192e, and 192f may be positioned between the plurality of nozzles 131, 132, 133, 134, 135, and 136 and the plurality of burners 141, 142, 143, 144, 145, and 146.

Specifically, a first upper hole 192a may face a first lower hole 191a between the first nozzle 131 and the first burner 141. A second upper hole 192b may face a second lower hole 191b between the second nozzle 132 and the second burner 142. A third upper hole 192c may face a third lower hole 191c between the third nozzle 133 and the third burner 143. A fourth upper hole 192d may face a fourth lower hole 191d between the fourth nozzle 134 and the fourth burner 144. A fifth upper hole 192e may face a fifth lower hole 191e between the fifth nozzle 135 and the fifth burner 145. A sixth upper hole 192f may face a sixth lower hole 191f between the sixth nozzle 136 and the sixth burner 146.

The upper holes 192a, 192b, 192c, 192d, 192e, and 192f and the lower holes 191a, 191b, 191c, 191d, 191e, and 191f may be collectively referred to as primary holes. Meanwhile, according to an embodiment, any one of the upper holes 192a, 192b, 192c, 192d, 192e, and 192f and the lower holes 191a, 191b, 191c, 191d, 191e, and 191f may be omitted.

The air shutter 190 may include a shutter assembly 193, 194, 195, and 196. The shutter assembly 193, 194, 195, and 196 may include a first rack 193, a second rack 194, a rotary motor 195, and a pinion 196.

The first rack 193 may be elongated along the first housing 191, and may be located inside the first housing 191. In the front-back direction, a length L3 of the first rack 193 may be smaller than a length of the first housing 191. In the left-right direction, a width w3 of the first rack 193 may be smaller than a width of the first housing 191. The first rack 193 may be coupled to the inside of the first housing 191 to be movable in the front-rear direction. For example, a first rail (not shown) may be provided inside the first housing 191, and may guide the movement of the first rack 193. The first rack 193 may be referred to as a lower plate.

In addition, a plurality of first holes 193a, 193b, 193c, 193d, 193e, and 193f may be formed to penetrate the first rack 193 in the up-down direction, and may be spaced apart from each other in the front-rear direction. For example, the shapes of the first holes 193a, 193b, 193c, 193d, 193e, and 193f may be substantially identical to the shapes of the lower holes 191a, 191b, 191c, 191d, 191e, and 191f For example, the number of first holes 193a, 193b, 193c, 193d, 193e, and 193f may be equal to the number of lower holes 191a, 191b, 191c, 191d, 191e, and 191f. For example, intervals between the first holes 193a, 193b, 193c, 193d, 193e, and 193f may be identical to intervals between the lower holes 191a, 191b, 191c, 191d, 191e, and 191f The second rack 194 may be elongated along the second housing 192, and may be located inside the second housing 192. In the front-back direction, a length L4 of the second rack 194 may be smaller than a length of the second housing 192. In the left-right direction, a width w4 of the second rack 194 may be smaller than a width of the second housing 192. The second rack 194 may be coupled to the inside of the second housing 192 to be movable in the front-rear direction. For example, a second rail (not shown) may be provided inside the second housing 191, and may guide the movement of the second rack 194. The second rack 194 may be referred to as an upper plate.

In addition, a plurality of second holes 194a, 194b, 194c, 194d, and 194e may be formed to penetrate the second rack 194 in the up-down direction, and may be spaced apart from each other in the front and rear directions. For example, the shapes of the second holes 194a, 194b, 194c, 194d, and 194e may be substantially identical to the shapes of the upper holes 192a, 192b, 192c, 192d, 192e, and 192f For example, the number of the upper holes 192a, 192b, 192c, 192d, 192e, and 192f of the second holes 194a, 194b, 194c, 194d, and 194e may be one less than the number of the upper holes 192a, 192b, 192c, 192d, 192e, and 192f. In this case, the length L4 of the second rack 194 may be smaller than the length L3 of the first rack 193. For example, intervals between the second holes 194a, 194b, 194c, 194d, and 194e may be identical to intervals between the upper holes 192a, 192b, 192c, 192d, 192e, and 192f.

The rotary motor 195 may provide a rotational force. The rotary motor 195 may be an electric motor, and may be capable of adjusting a rotation direction and a rotation angle. The rotary motor 195 may be located to the right of the housing 191 and 192. A rotational shaft 195a of the rotary motor 195 may extend to the left from the rotary motor 195 and may pass through a shaft hole 191g of the housing 191 and 192.

The pinion 196 may be located in the inner space of the housing 191 and 192 and may be adjacent to one end of the housing 191 and 192. The pinion 196 may be fixed to the rotational shaft 195a of the rotary motor 195. Between the first rack 193 and the second rack 194, the pinion 196 may be engaged with a first gear tooth 193t of the first rack 193 and a second gear tooth 194t of the second rack 194. In this case, the first gear tooth 193t and the second gear tooth 194t may be formed in the first rack 193 and the second rack 194 to correspond to movement trajectories of the first rack 193 and the second rack 194, which will be described later. The pinion 196 may be referred to as a gear or a cogwheel.

Accordingly, when the rotary motor 195 is driven, the pinion 196 may be rotated in a first rotation direction Rw1 or a second rotation direction Rw2, and the first rack 193 and the second rack 194 may move in different directions. For example, when the pinion 196 is rotated in the first rotational direction Rw1, the first rack 193 may move forward and the second rack 194 may move rearward. For example, when the pinion 196 is rotated in a second rotation direction Rw2, the first rack 193 may move rearward and the second rack 194 may move forward. That is, the lower holes 191a, 191b, 191c, 191d, 191e, and 191f and the upper holes 192a, 192b, 192c, 192d, 192e, and 192f may be simultaneously opened or closed by the first rack 193 and the second rack 194.

Referring to FIG. 8, a controller C may receive information from a thermostat TS, which is provided in an indoor space, through a communication part T. For example, the information received from the thermostat TS may include information such as a heating signal, a heating intensity, a desired indoor temperature, or a current indoor temperature.

The controller C may receive information on an operation of the gas furnace from a sensor SS. For example, the sensor SS may detect a temperature of air introduced into or discharged from the blower 16 or a temperature of air that has passed through the heat exchanger 150.

The igniter 1401 and the flame detector 1402 may be electrically connected to the controller C. That is, the controller C may control the operation of the igniter 1401, and may receive information on whether or not a flame is detected from the flame detector 1402.

The blower 16, the inducer 170, and the fuel valve 120 may be electrically connected to the controller C. That is, the controller C may adjust a revolution per minute (RPM) of the blower 16, an RPM of the inducer 170, and an opening degree of the fuel valve 120.

The rotary motor 195 may be electrically connected to the controller C. That is, the controller C may adjust a rotation direction and a rotation angle of the rotary motor 195.

A memory M may be electrically connected to the controller C. The memory M may store information associated with an operation of the gas furnace, information associated with a control operation of the controller C, and the like, and may provide the stored information to the controller C.

Referring to FIGS. 8 and 9, the controller C may detect a required load Ld (S1). Here, a required load Ld may be a required thermal power of the gas furnace. For example, the required load Ld may be a load arbitrarily input by a user through the thermostat TS. In another example, the required load Ld may be greater as a difference (hereinafter, referred to as a temperature difference) between a desired indoor temperature input to the thermostat TS and a current indoor temperature detected by the thermocouple of the thermostat TS becomes greater. In another example, the required load Ld may be determined based on a temperature difference and temperature information on air flowing into the blower 16, which is sensed by the sensor SS.

After S1, the controller C may determine whether the required load Ld is greater than a first load L1 but less than or equal to a maximum load Lm (S10). Here, the maximum load Lm may be a maximum thermal power of the gas furnace. For example, the first load L1 may be ⅓ of the maximum load Lm.

When the required load Ld is greater than the first load L1 but less than or equal to the maximum load Lm (Yes in S10), the controller C may perform a first operation mode (S11, S12, and S13) which will be described later with reference to FIGS. 10 and 11.

When the required load Ld is less than or equal to the first load L1 (No in S10), the controller C may perform a second operation mode (S14, S15, and S16) which will be described later with reference to FIGS. 12 and 13.

Referring to FIGS. 9 to 11, by adjusting a rotation direction and a rotation angle of the rotary motor 195, the controller C (see FIG. 8) may fully open the plurality of lower holes 191*a*, 191*b*, 191*c*, 191*d*, 191*e*, and 191*f* and the plurality of upper holes 192*a*, 192*b*, 192*c*, 192*d*, 192*e*, and 192*f* (S11).

Specifically, the plurality of first holes 193*a*, 193*b*, 193*c*, 193*d*, 193*e*, and 193*f* of the first rack 193 may be aligned with the plurality of lower holes 191*a*, 191*b*, 191*c*, 191*d*, 191*e*, and 191*f*, respectively. In addition, the plurality of second holes 194*a*, 194*b*, 194*c*, 194*d*, and 194*e* (see FIG. 7) of the second rack 194 may be aligned with the second to sixth upper holes 192*a*, 192*b*, 192*c*, 192*d*, and 192*f*, respectively. Also, the first upper hole 192*a* may not be covered by the second rack 194.

In this case, due to an inertial force and a viscous force of the fuel being injected from the plurality of nozzles 131, 132, 133, 134, 135, and 136 (see FIG. 5) to the plurality of burners 141, 142, 143, 144, 145, and 146, primary air A1 may be entrained into the inner space of the housing 191 and 192 and the burners through the plurality of lower holes 191*a*, 191*b*, 191*c*, 191*d*, 191*e*, and 191*f* and the plurality of upper holes 192*a*, 192*b*, 192*c*, 192*d*, 192*e*, and 192*f*.

In addition, secondary air A2 may be sucked into exits 141*e*, 142*e*, 143*e*, 144*e*, 145*e*, and 146*e* of the plurality of burners 141, 142, 143, 144, 145, and 146 by the inducer 170 (see FIG. 4).

In addition, the controller C may adjust an opening degree of the fuel valve 120 (see FIG. 4) and an RPM of the inducer 170 (see FIG. 4) in response to the required load Ld (S12 and S13). That is, in response to a greater required load Ld, the opening degree of the fuel valve 120 and the RPM of the inducer 170 may be increased, and in this case, a speed of fluid passing through the burner may be increased.

Accordingly, the primary air A1 and the fuel may pass through the plurality of burners 141, 142, 143, 144, 145, and 146 to form a mixture, and the mixture may be combusted together with the secondary air A2. A flame formed through the combustion may be referred to as a partially premixed flame. The partially premixed flame may have a shorter flame length than that of a diffusion flame to be described later due to the premixing characteristics, and may minimize damage to the heat exchanger due to the flame. In addition, the partially premixed flame may have a high mixing ratio of air and fuel due to the premixing characteristics, and thus, the partially premixed flame may be advantageous in reducing flame temperature and reduce thermal NOx.

Referring to FIGS. 9, 12 and 13, by adjusting the rotation direction and the rotation angle of the rotary motor 195, the controller C (see FIG. 8) may fully close the plurality of lower holes 191*a*, 191*b*, 191*c*, 191*d*, 191*e*, and 191*f* and the plurality of upper holes 192*a*, 192*b*, 192*c*, 192*d*, 192*e*, and 192*f* (see FIG. 5) (S14).

Specifically, the first rack 193 may close the plurality of lower holes 191*a*, 191*b*, 191*c*, 191*d*, 191*e*, and 191*f*. In addition, the second rack 194 may close the plurality of upper holes 192*a*, 192*b*, 192*c*, 192*d*, 192*e*, and 192*f*. In this case, the primary air may be prevented from flowing into the internal space of the housing 191 and 192 and the burner.

In addition, the secondary air A2 may be sucked into the exits 141*e*, 142*e*, 143*e*, 144*e*, and 145*e* of the plurality of burners 141, 142, 143, 144, 145, and 146 by the inducer 170 (see FIG. 4).

Also, the controller C may adjust an opening degree of the fuel valve 120 (see FIG. 4) and an RPM of the inducer 170 (see FIG. 4) in response to the required load Ld (S15 and S16). That is, in response to a smaller required load Ld, the opening degree of the fuel valve 120 and the RPM of the inducer 170 may be reduced, and in this case, a speed of a fluid passing through the burner may be reduced.

Accordingly, the fuel may pass through the plurality of burners 141, 142, 143, 144, 145 and 146, and may be combusted together with the secondary air A2. A flame formed through the combustion may be referred to as a diffusion flame. The diffusion flame does not have premixing characteristics, and thus, the diffusion flame may be advantageous when a relatively low thermal power is required compared to the aforementioned partially premixed flame, that is, when a velocity of a fluid passing through the burner is relatively low. In other words, at a relatively low thermal power, the stability of the diffusion flame may be higher than that of the partially premixed flame. For example, even when the required load Ld is ¹⁄₂₀ or more of the maximum load Lm, the diffusion flame may be stable without a problem such as flash back. That is, it is possible to secure flame stability even at a high TDR (Top Down Ratio).

Referring to FIGS. 8 and 14, when the required load Ld is greater than the first load L1 but less than the maximum load Lm (Yes in S10), the controller C may perform the first operation mode (S11, S12, and S13) which is described above with reference to FIGS. 10 and 11.

When the required load Ld is less than or equal to the first load L1 (No in S10), the controller C may determine whether the required load Ld is greater than the second load L2 but less than or equal to the first load L1 (S20). For example, the first load L1 may be ⅓ of the maximum load Lm, and the second load L2 may be ¼ or ⅛ of the maximum load Lm.

When the required load Ld is greater than the second load L2 but less than or equal to the first load L1 (Yes in S20), the controller C may perform a third operation mode (S21, S22, and S23) which will be described later with reference to FIG. 15.

When the required load Ld is equal to or less than the second load L2 (No in S20), the controller C may perform a second operation mode (S14, S15, and S16) which is identical to the second operation mode (S14, S15, and S16) described above with reference to FIGS. 12 and 13.

Referring to FIGS. 14 and 15, by adjusting a rotation direction and a rotation angle of the rotary motor 195 stepwise, the controller C (see FIG. 8) may partially open the plurality of lower holes 191a, 191b, 191c, 191d, 191e, and 191f (see FIG. 5) and the plurality of upper holes 192a, 192b, 192c, 192d, 192e, and 192f (S21).

Specifically, the first rack 193 may partially open the plurality of lower holes 191a, 191b, 191c, 191d, 191e, and 191f. In addition, the second rack 194 may partially open the plurality of upper holes 192a, 192b, 192c, 192d, 192e, and 192f.

In this case, due to an inertial force and a viscous force of the fuel being injected from the plurality of nozzles 131, 132, 133, 134, 135, and 136 (see FIG. 5) to the plurality of burners 141, 142, 143, 144, 145, and 146, the primary air A1 may be entrained into the inner space of the housing 191 and 192 and the burners through a part of each of the plurality of lower holes 191a, 191b, 191c, 191d, 191e, and 191f and a part of each of the plurality of upper holes 192a, 192b, 192c, 192d, 192e, and 192f.

In addition, the secondary air A2 may be sucked into the exits 141e, 142e, 143e, 144e, and 145e of the plurality of burners 141, 142, 143, 144, 145, and 146 by the inducer 170 (see FIG. 4).

In addition, the controller C may adjust an opening degree of the fuel valve 120 (see FIG. 4) and an RPM of the inducer 170 (see FIG. 4) in response to the required load Ld (S22 and S23). That is, in response to a smaller required load Ld, the opening degree of the fuel valve 120 and the RPM of the inducer 170 may be reduced, and in this case, a speed of a fluid passing through the burner may be reduced.

Accordingly, the primary air A1 and the fuel may pass through the plurality of burners 141, 142, 143, 144, 145, and 146 to form a mixture, and the mixture may be combusted together with the secondary air A2. A flame formed through the combustion may be referred to as a partially premixed flame. In this case, it may be more advantageous when a relatively low thermal power is required than in the case described above with reference to FIG. 10. Also, in this case, it may be more advantageous in reducing a flame length and an amount of thermal NOx than the case described above with reference to FIG. 12.

Certain embodiments or other embodiments of the disclosure described above are not mutually exclusive or distinct from each other. Any or all components of the embodiments of the disclosure described above may be combined with another or combined with each other in configuration or function.

For example, a configuration "A" described in one embodiment of the disclosure and the drawings and a configuration "B" described in another embodiment of the disclosure and the drawings may be combined with each other. Namely, although the combination between the configurations is not directly described, the combination is possible except in the case where it is described that the combination is impossible.

Although embodiments have been described with reference to a number of illustrative embodiments thereof, it should be understood that numerous other modifications and embodiments can be devised by those skilled in the art that will fall within the scope of the principles of this disclosure.

What is claimed is:

1. A gas furnace, comprising:
at least one burner configured to burn fuel;
a manifold that provides the fuel to an entry of the at least one burner;
a heat exchanger spaced apart from an exit of the at least one burner and that provides a passage for combustion gas generated by the at least one burner;
an inducer configured to cause a flow of a fluid passing through the at least one burner and the heat exchanger;
a blower configured to cause a flow of air passing around the heat exchanger; and
an air shutter positioned between the manifold and the entry of the at least one burner, wherein the air shutter comprises:
at least one housing having an inner space that communicates with the manifold and the entry of the at least one burner; and
at least one primary hole formed to penetrate the at least one housing and able to be opened and closed.

2. The gas furnace of claim 1, further comprising:
at least one nozzle having a first side coupled to the manifold and a second side coupled to the at least one housing, wherein the at least one nozzle faces the entry of the at least one burner, and wherein the at least one primary hole is positioned between the at least one nozzle and the entry of the at least one burner.

3. The gas furnace of claim 2, wherein the at least one burner comprises a plurality of burners spaced apart from each other, wherein the at least one housing extends in a direction in which the plurality of burners is spaced apart from each other, and wherein the at least one primary hole comprises a plurality of primary holes spaced apart from each other in a longitudinal direction of the at least one housing.

4. The gas furnace of claim 3, wherein the plurality of primary holes is simultaneously opened or closed.

5. The gas furnace of claim 4, wherein the plurality of primary holes comprises a plurality of lower holes formed to penetrate a first side of the at least one housing and provided in a number equal to a number of the plurality of burners, and wherein the air shutter further comprises a first rack coupled to the first side of the at least one housing to be movable in the longitudinal direction of the at least one housing, the first rack having a plurality of first holes that is formed to penetrate the first rack and spaced apart from each other at intervals identical to an interval between the plurality of lower holes.

6. The gas furnace of claim 5, wherein the plurality of primary holes further comprises a plurality of upper holes formed to penetrate a second side of the at least one housing and facing the plurality of lower holes, and wherein the air shutter further comprises a second rack coupled to the second side of the at least one housing to be movable in the longitudinal direction of the at least one housing, the second rack having a plurality of second holes that is formed to penetrate the second rack and spaced apart from each other at intervals identical to intervals between the plurality of upper holes.

7. The gas furnace of claim 6, wherein the first rack and the second rack are movably coupled to an inside of the at least one housing, wherein the air shutter further comprises:
a rotary motor located outside of the at least one housing and having a rotational shaft that penetrates the at least one housing; and
a pinion fixed to the rotational shaft of the rotary motor and engaged with the first rack and the second rack at a position between the first rack and the second rack, and wherein the pinion is rotatable in a first rotational direction or in a second rotational direction that is opposite to the first rotational direction.

8. The gas furnace of claim 7, wherein a length of the first rack is greater than a length of the second rack, and wherein a number of the plurality of first holes is greater than a number of the plurality of second holes.

9. The gas furnace of claim 7, wherein the pinion is rotatable stepwise.

10. The gas furnace of claim 7, further comprising:
a fuel valve that provides the fuel to the manifold; and
a controller configured to control the rotary motor, the fuel valve, and the inducer, wherein the controller is configured to:
in response to a required load being greater than a first load but less than a maximum load, control the rotary motor so as to fully open the plurality of lower holes and the plurality of upper holes; and
control an opening degree of the fuel valve and a revolution per minute (RPM) of the inducer.

11. The gas furnace of claim 10, wherein the controller is further configured to:
in response to the required load being less than or equal to the first load, control the rotary motor so as to fully close at the plurality of lower holes and the plurality of upper holes; and
control the opening degree of the fuel valve and the revolution per minute (RPM) of the inducer to correspond to the required load.

12. The gas furnace of claim 10, wherein the controller is further configured to:
in response to the required load being greater than a second load but less than the first load, control the rotary motor so as to partially open the plurality of lower holes and the plurality of upper holes; and
control the opening degree of the fuel valve and the revolution per minute (RPM) of the inducer.

13. The gas furnace of claim 12, wherein the controller is further configured to:
in response to the required load being less than or equal to the second load, control the rotary motor so as to fully close the plurality of lower holes and the plurality of upper holes; and
control the opening degree of the fuel valve and the revolution per minute (RPM) of the inducer to correspond to the required load.

14. The gas furnace of claim 4, wherein the at least one housing comprises:
a first housing opened upward; and
a second housing opened downward and detachably coupled to the first housing, wherein the gas furnace further comprises:
a first shell that extends along the first housing and coupled to one side of the first housing, the first shell having a plurality of lower portions that is formed by being pressed from an upper surface of the first shell and spaced apart from each other in a longitudinal direction of the first shell; and
a second shell that extends along the second housing and coupled to one side of the second housing, the second shell having a plurality of upper portions that is formed by being pressed upward from a lower surface of the second shell, spaced apart from each other in a longitudinal direction of the second shell, and faces the plurality of lower portions, and wherein the plurality of burners comprises the plurality of lower portions and the plurality of upper portions.

15. The gas furnace of claim 14, wherein the first shell further comprises a first flange that is a portion of the first shell other than the plurality of lower portions, wherein the second shell further comprises a second flange that is a portion of the second shell other than the plurality of upper portions and detachably coupled to the first flange, wherein a flame propagation port is formed in a portion between the first flange and the second flange positioned between the plurality of burners, and wherein the gas furnace further comprises:
an igniter adjacent to an exit of a burner positioned at a first end of the plurality of burners; and
a flame detector adjacent to an exit of a burner positioned at a second end of the plurality of burners.

16. The gas furnace of claim 14, wherein each of the plurality of burners comprises:
a venturi portion that forms an entry of each of the plurality of burners;
a head portion that forms an exit of each of the plurality of burners; and
a retainer inserted into the head portion.

17. An air conditioner having an outdoor unit and a ventilator that are connected to each other through a refrigerant pipe, wherein the ventilator comprises:
an air supply fan that forms a flow of air along an air supply passage;
an exhaust fan for that forms a flow of air along an exhaust passage separated from the air supply passage;
a plurality of coils located in the air supply passage and having refrigerant flowing therethrough; and
the gas furnace of claim 1, wherein the gas furnace is positioned downstream of the plurality of coils in the air supply passage.

* * * * *